Figure 1:
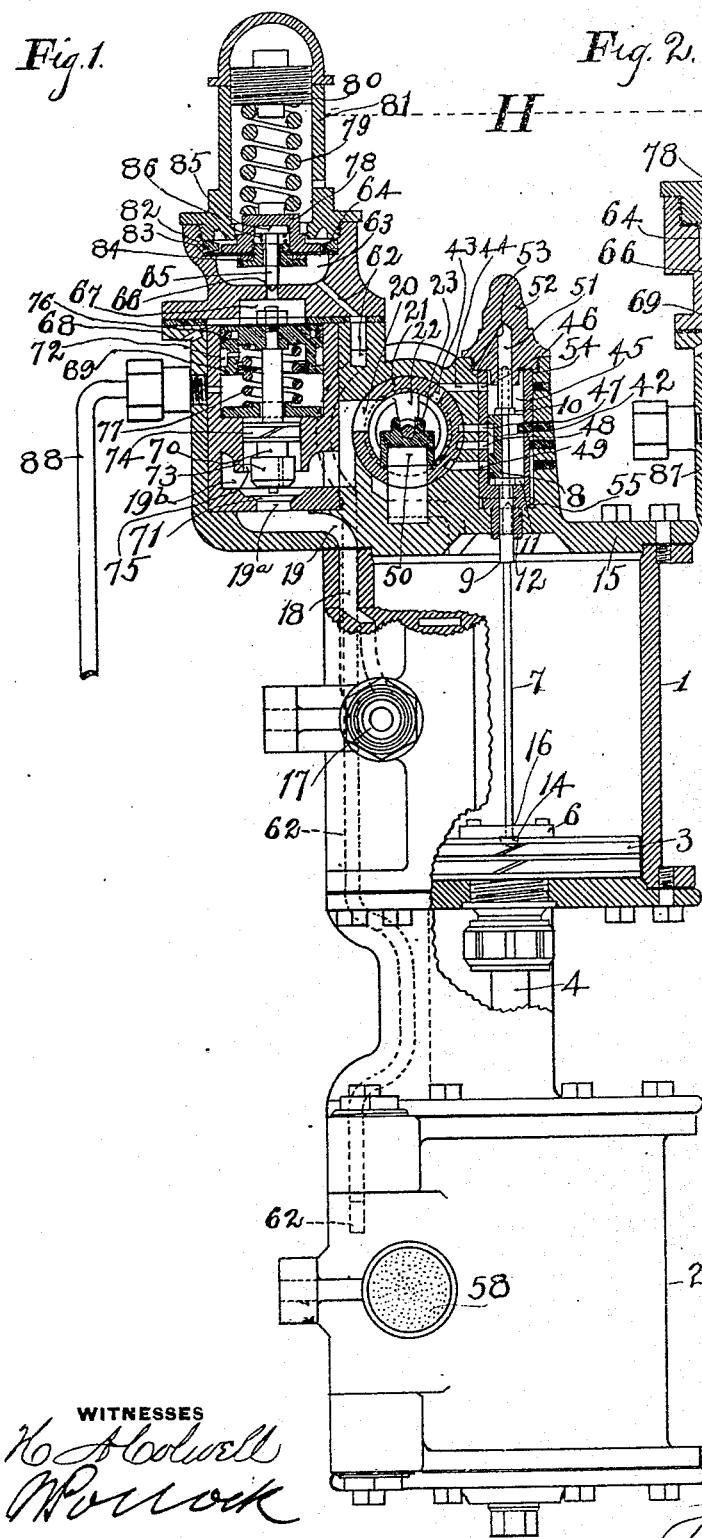

No. 787,723. PATENTED APR. 18, 1905.
J. S. BUBB.
QUICK ACTION AUTOMATIC FLUID PRESSURE BRAKE SYSTEM.
APPLICATION FILED DEC. 29, 1904.

14 SHEETS—SHEET 1.

WITNESSES
INVENTOR
John Scott Bubb

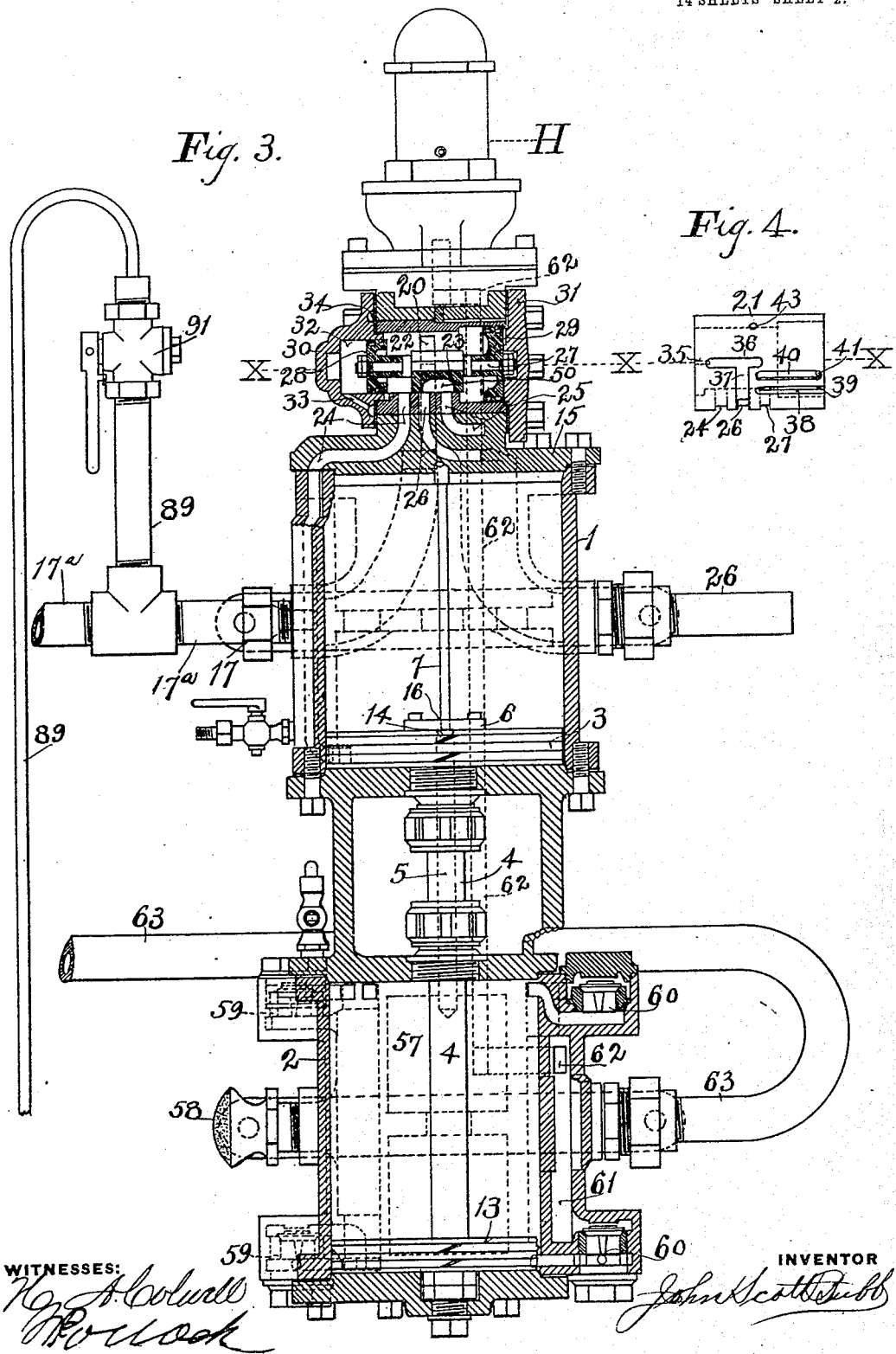

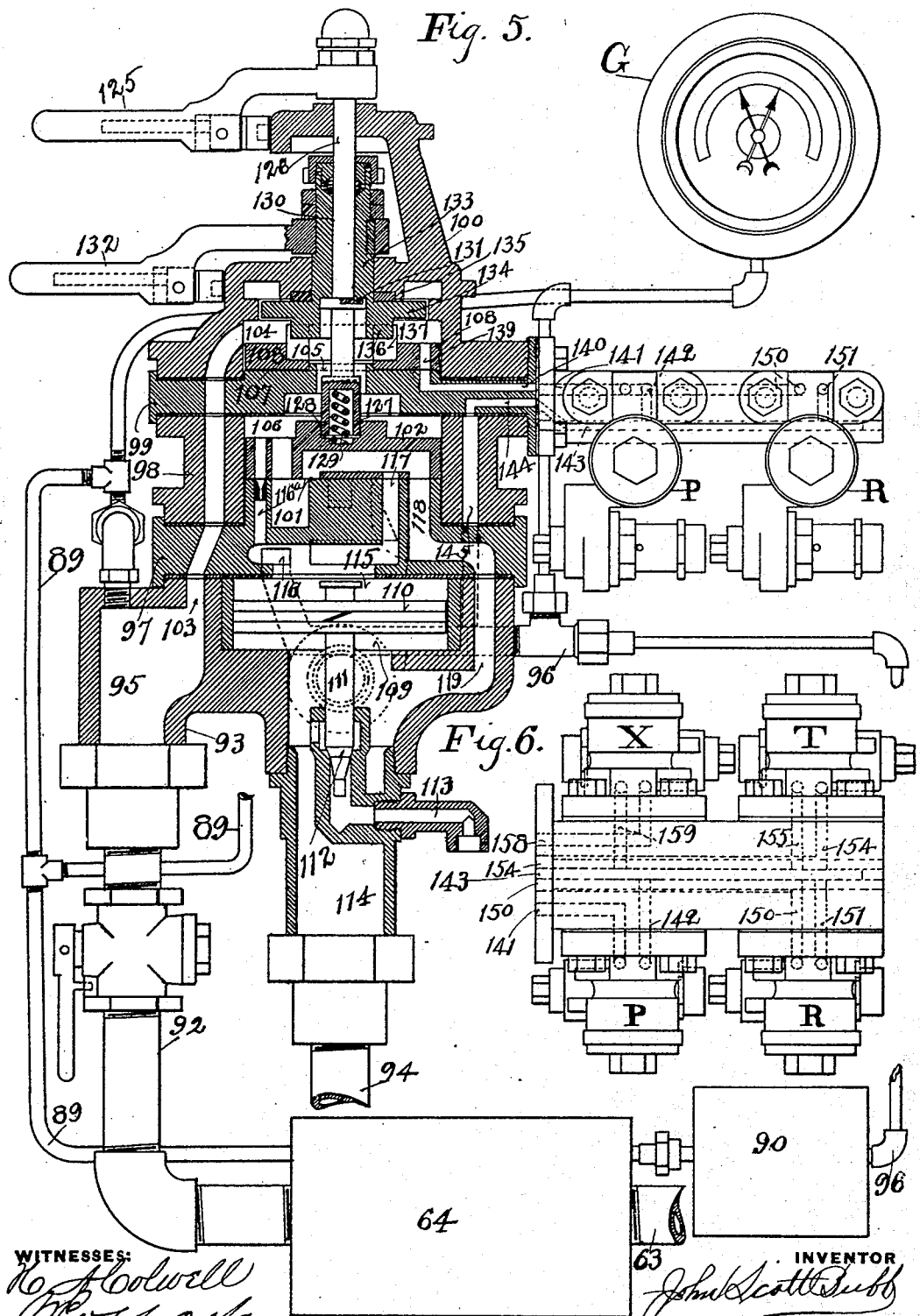

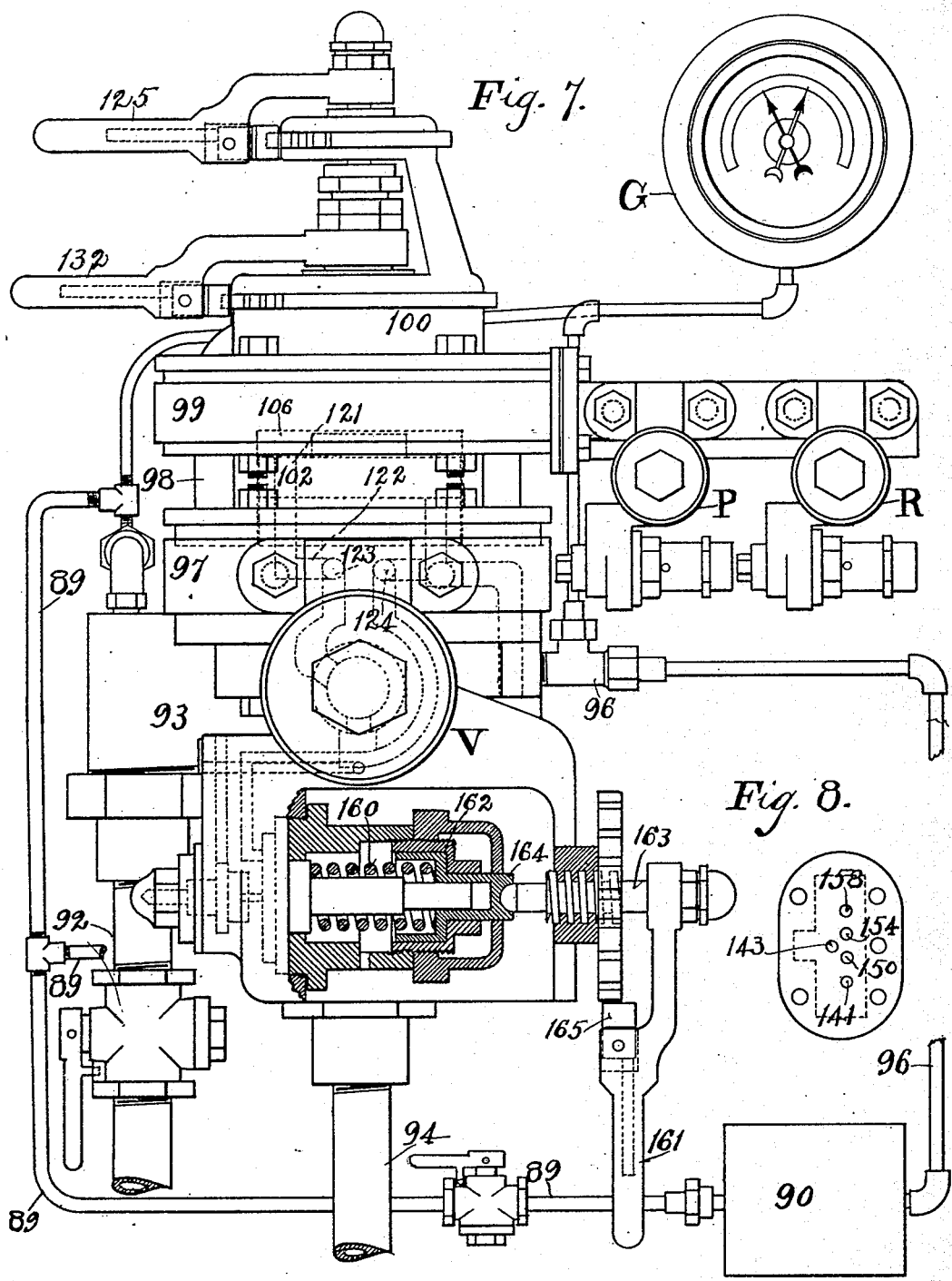

No. 787,723. PATENTED APR. 18, 1905.
J. S. BUBB.
QUICK ACTION AUTOMATIC FLUID PRESSURE BRAKE SYSTEM.
APPLICATION FILED DEC. 29, 1904.

14 SHEETS—SHEET 5.

No. 787,723. PATENTED APR. 18, 1905.
J. S. BUBB.
QUICK ACTION AUTOMATIC FLUID PRESSURE BRAKE SYSTEM.
APPLICATION FILED DEC. 29, 1904.
14 SHEETS—SHEET 6.
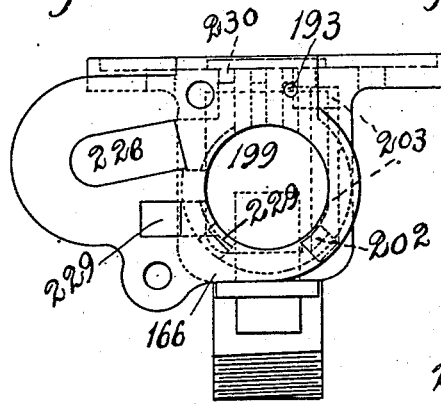
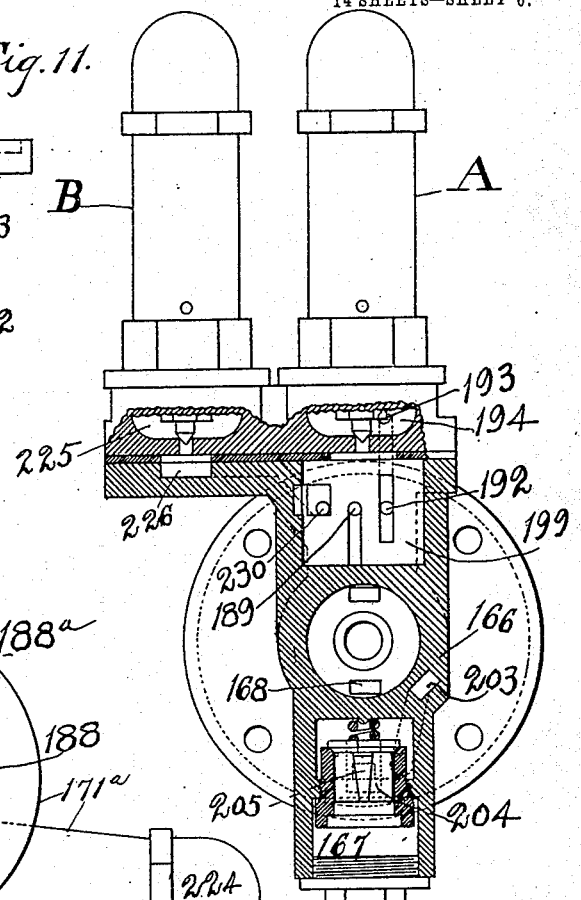
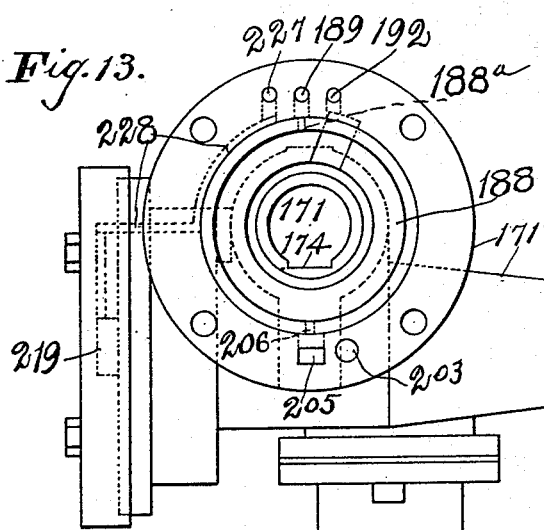
WITNESSES:
INVENTOR
John Scott Bubb

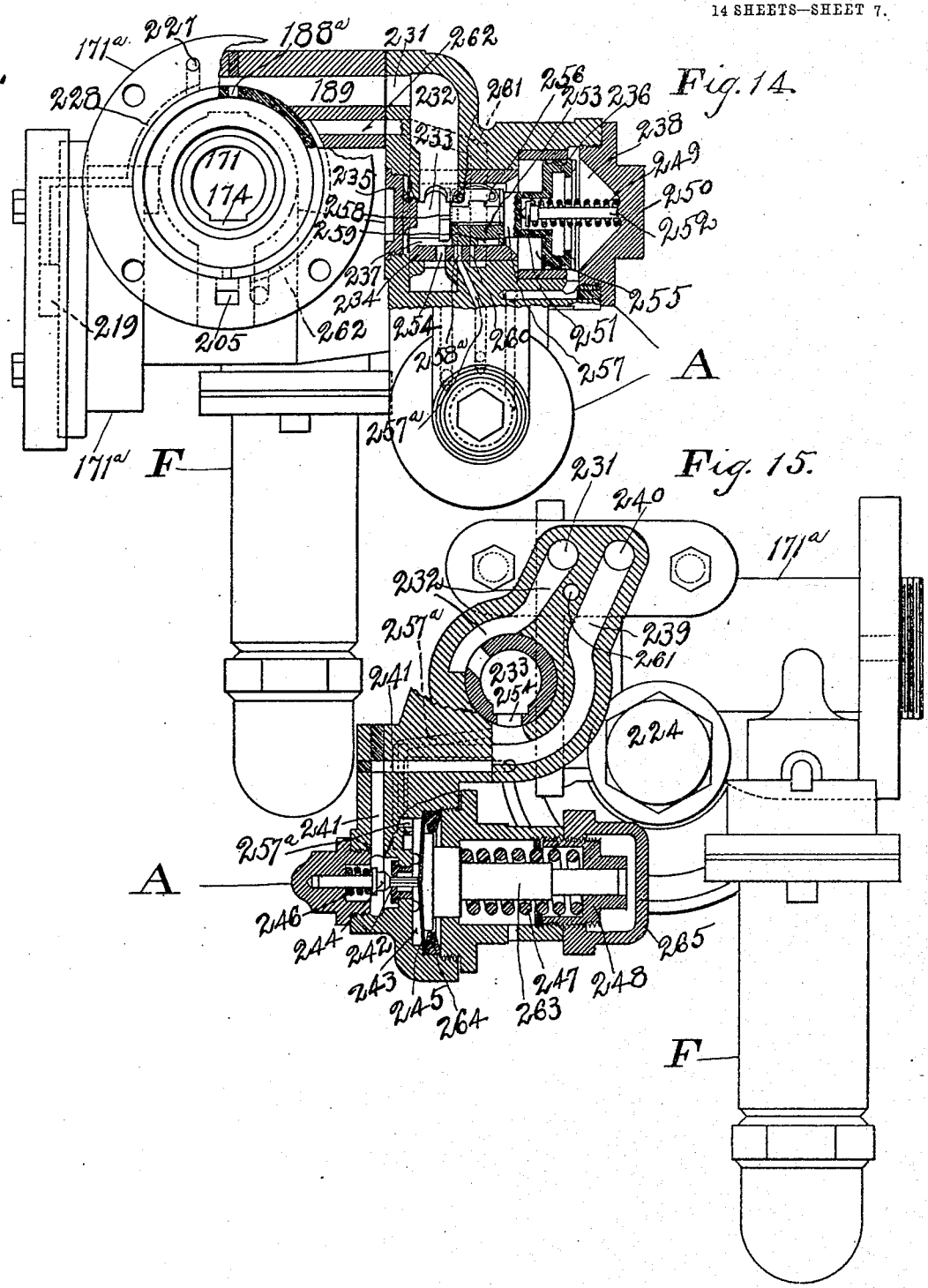

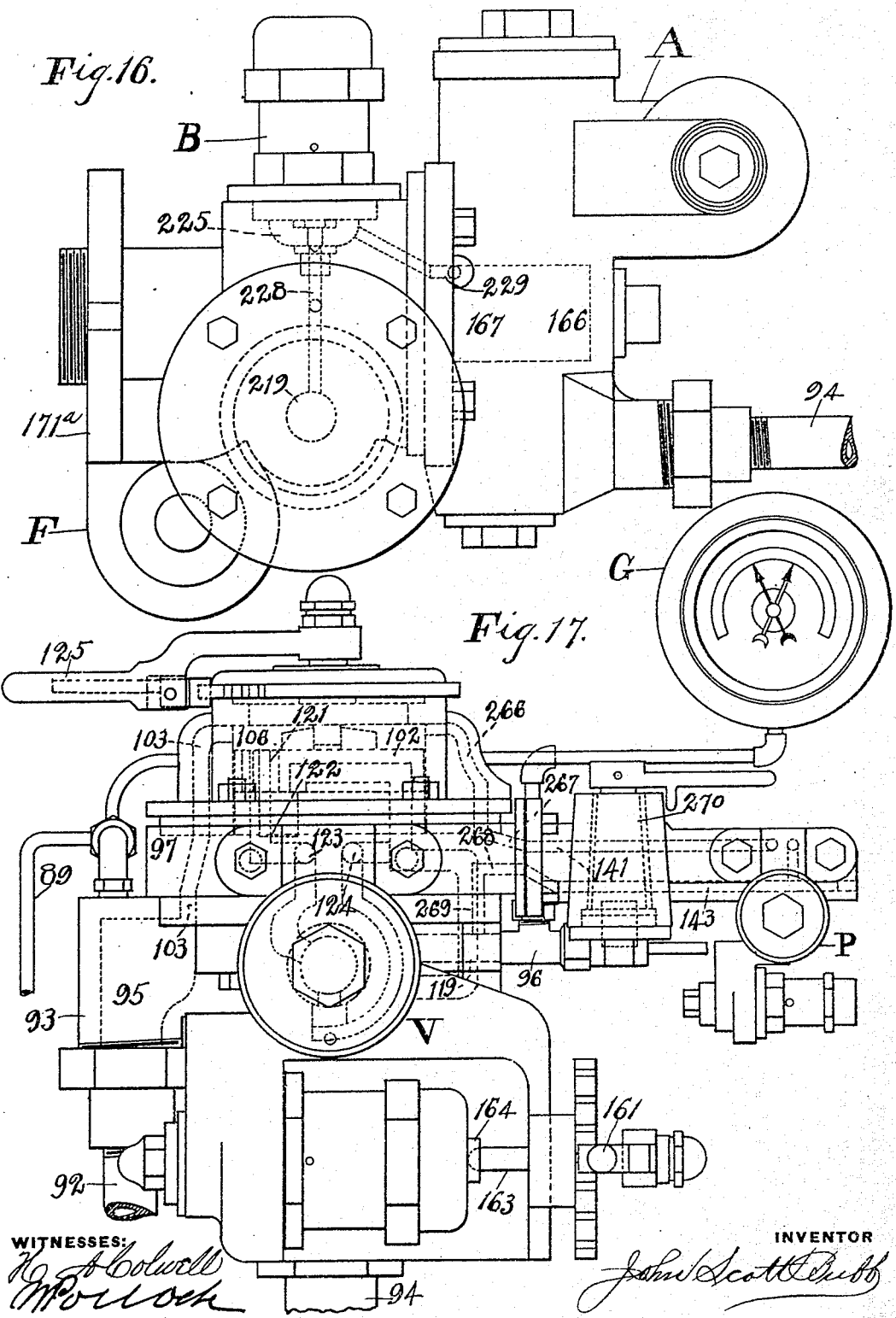

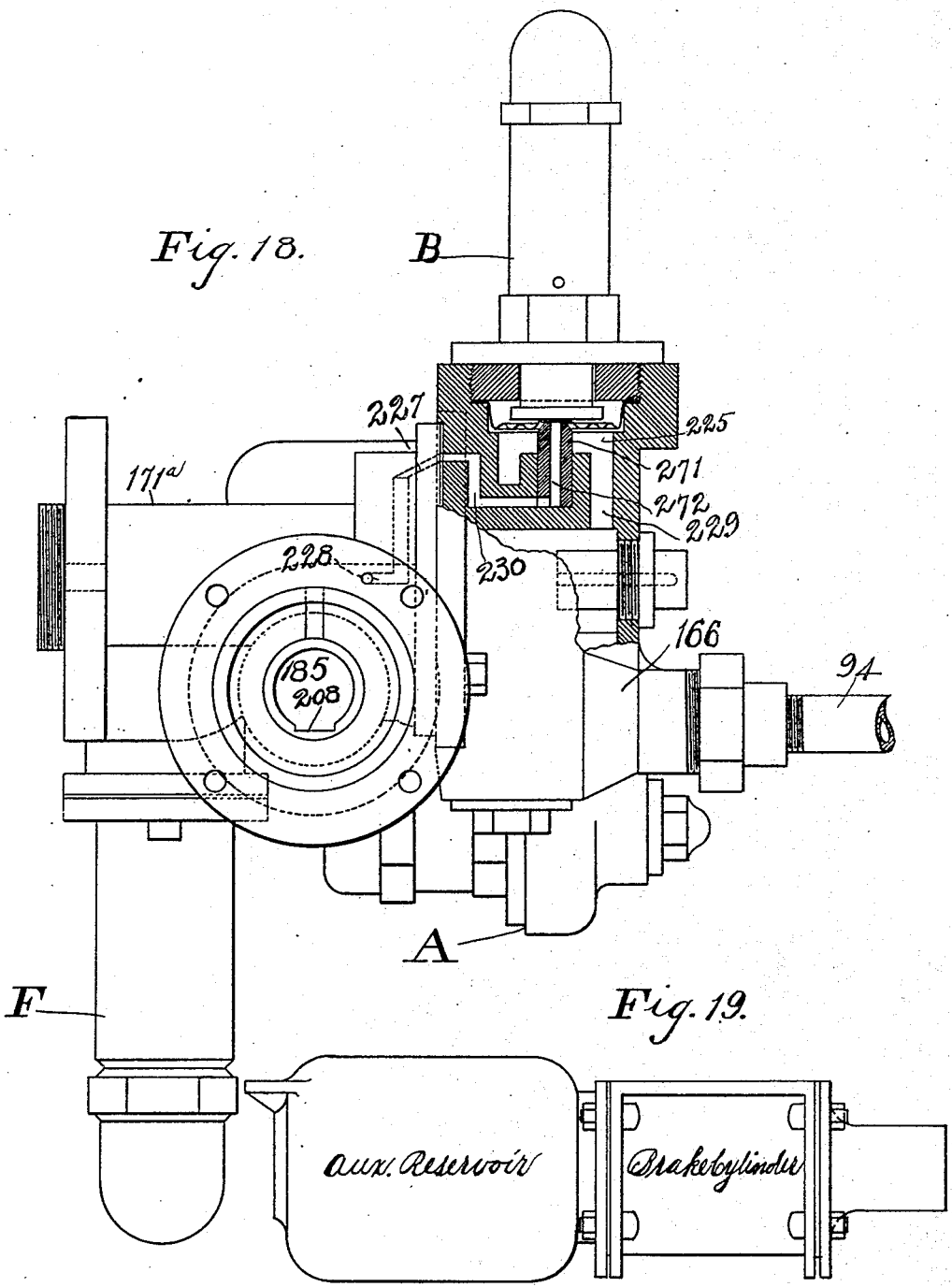

No. 787,723. PATENTED APR. 18, 1905.
J. S. BUBB.
QUICK ACTION AUTOMATIC FLUID PRESSURE BRAKE SYSTEM.
APPLICATION FILED DEC. 29, 1904.
14 SHEETS—SHEET 10.
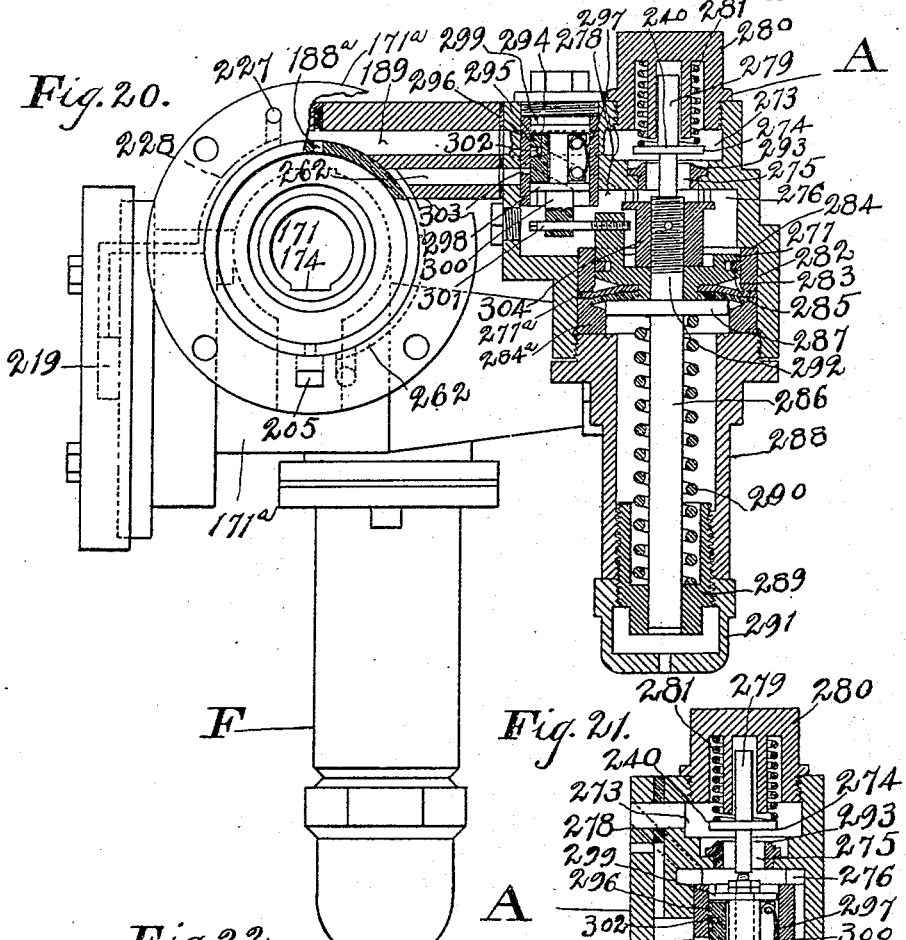
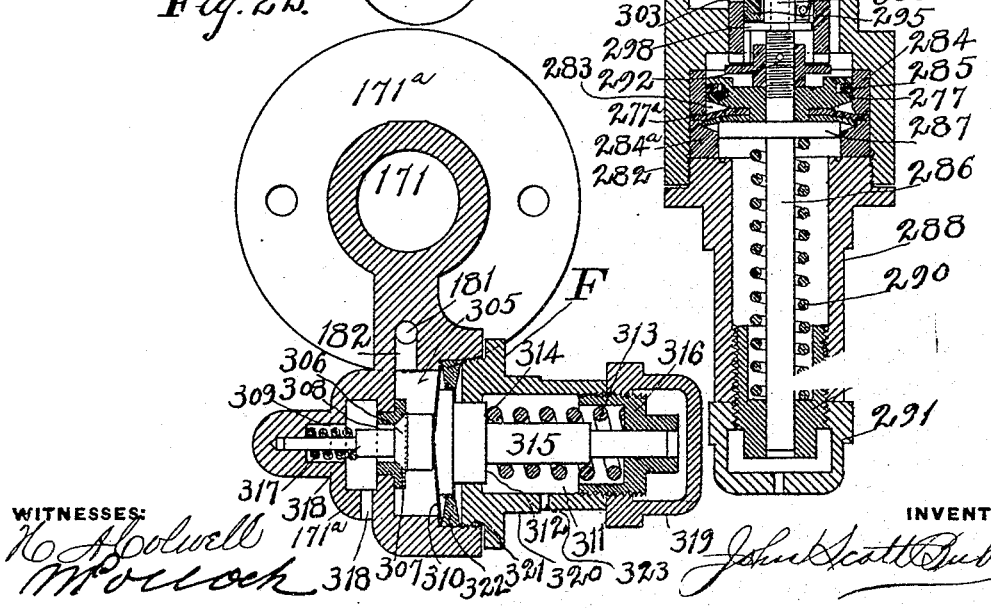

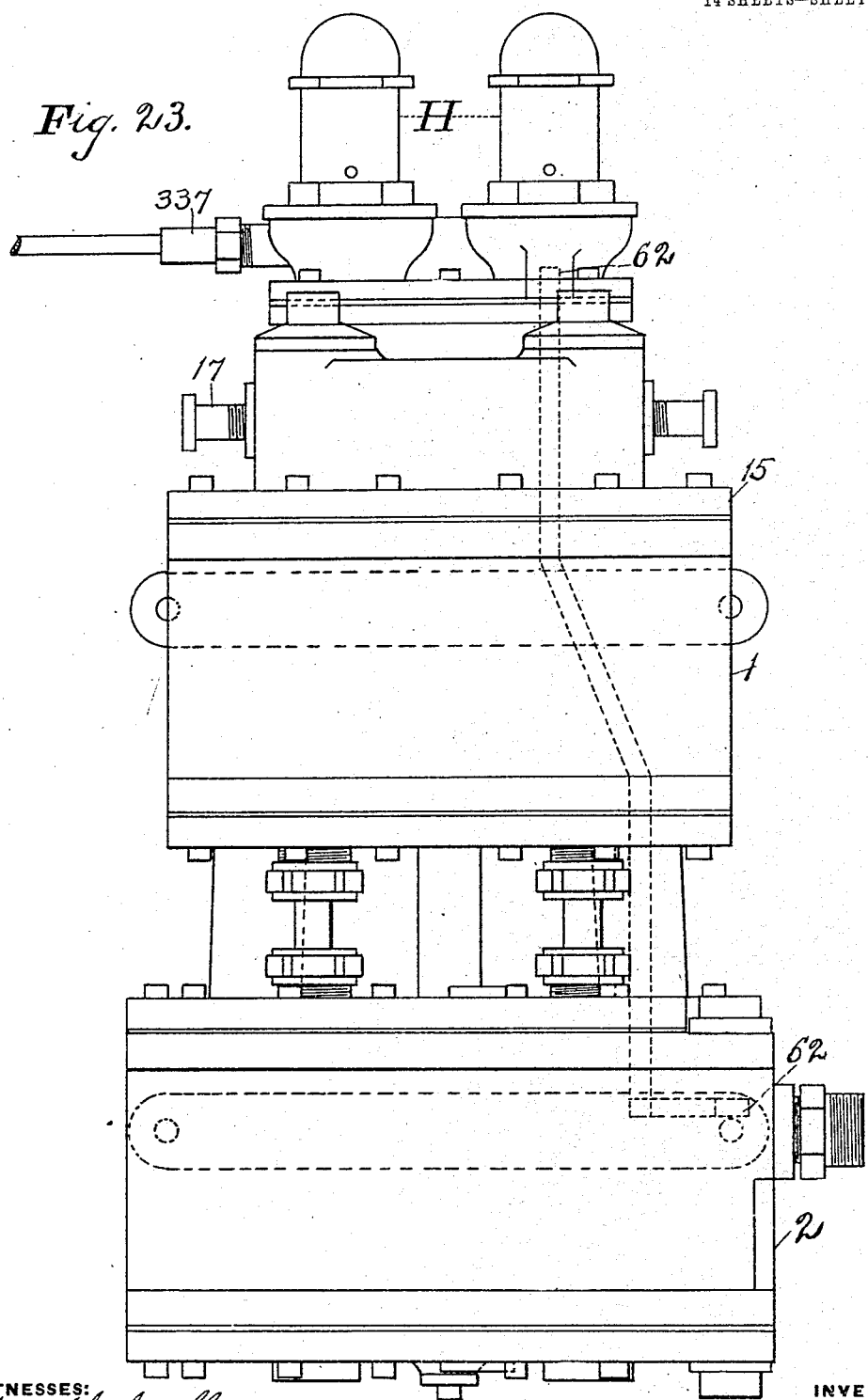

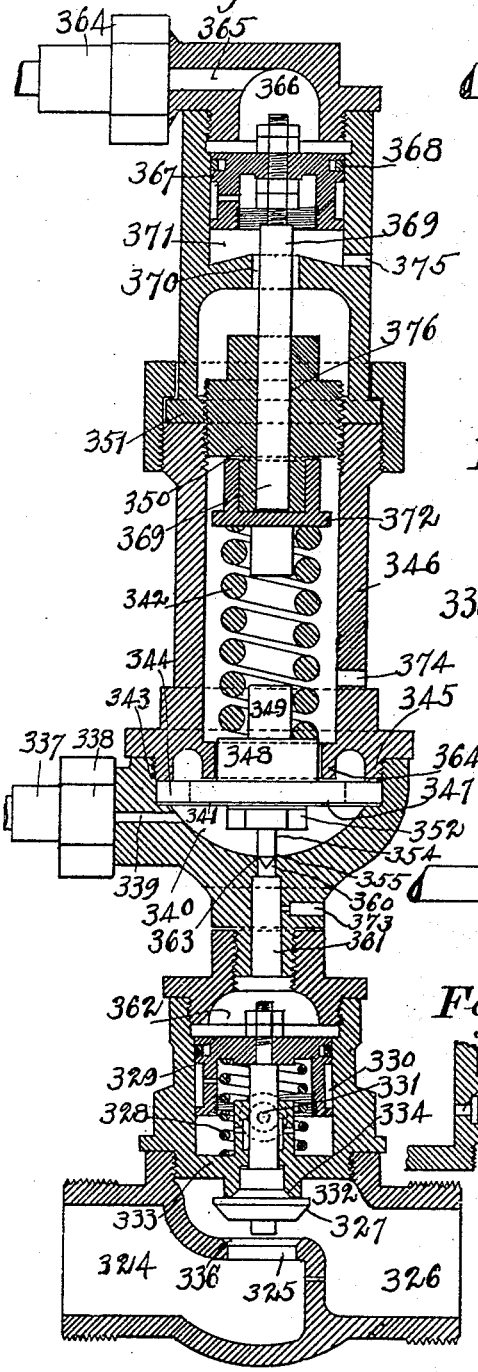

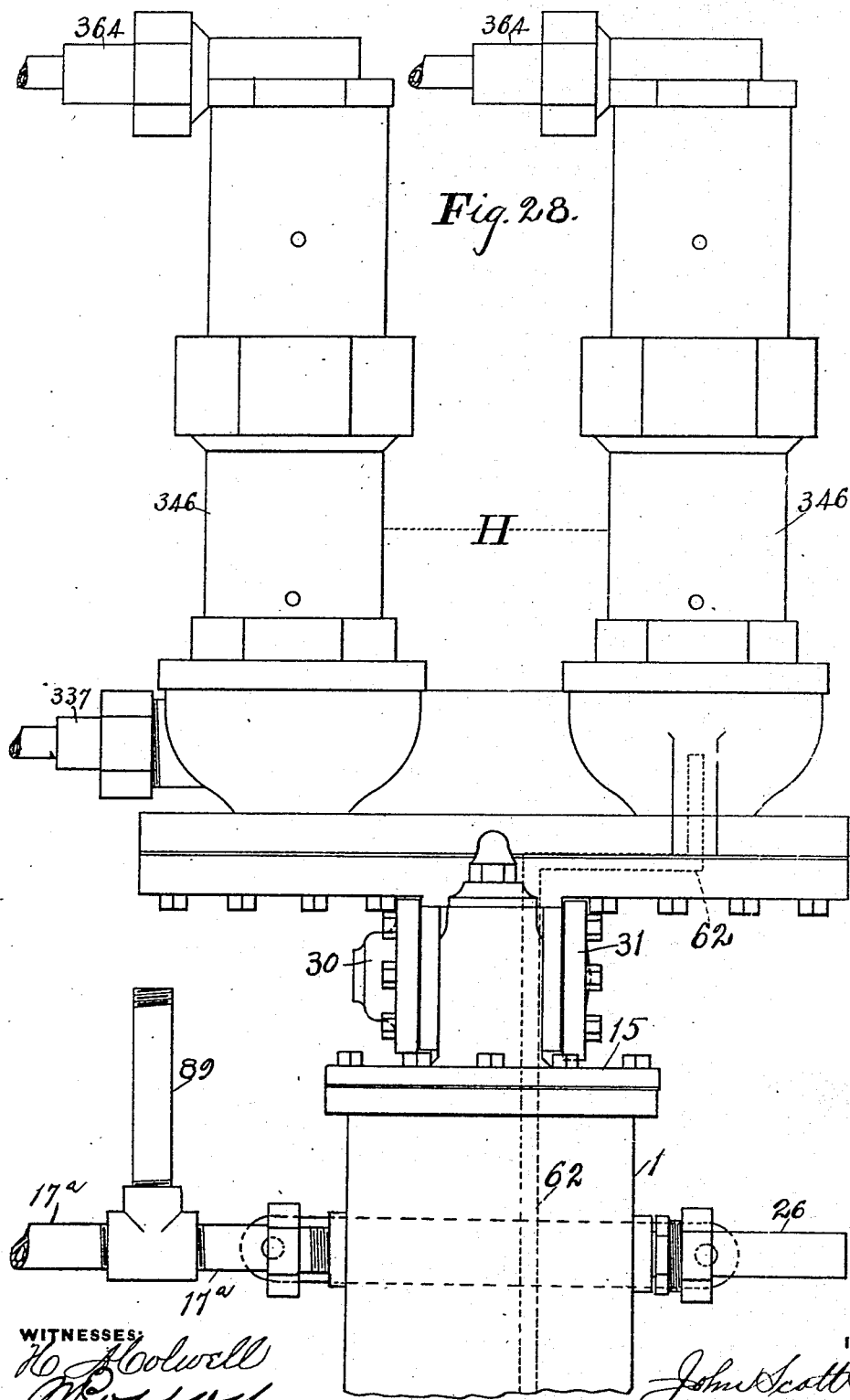

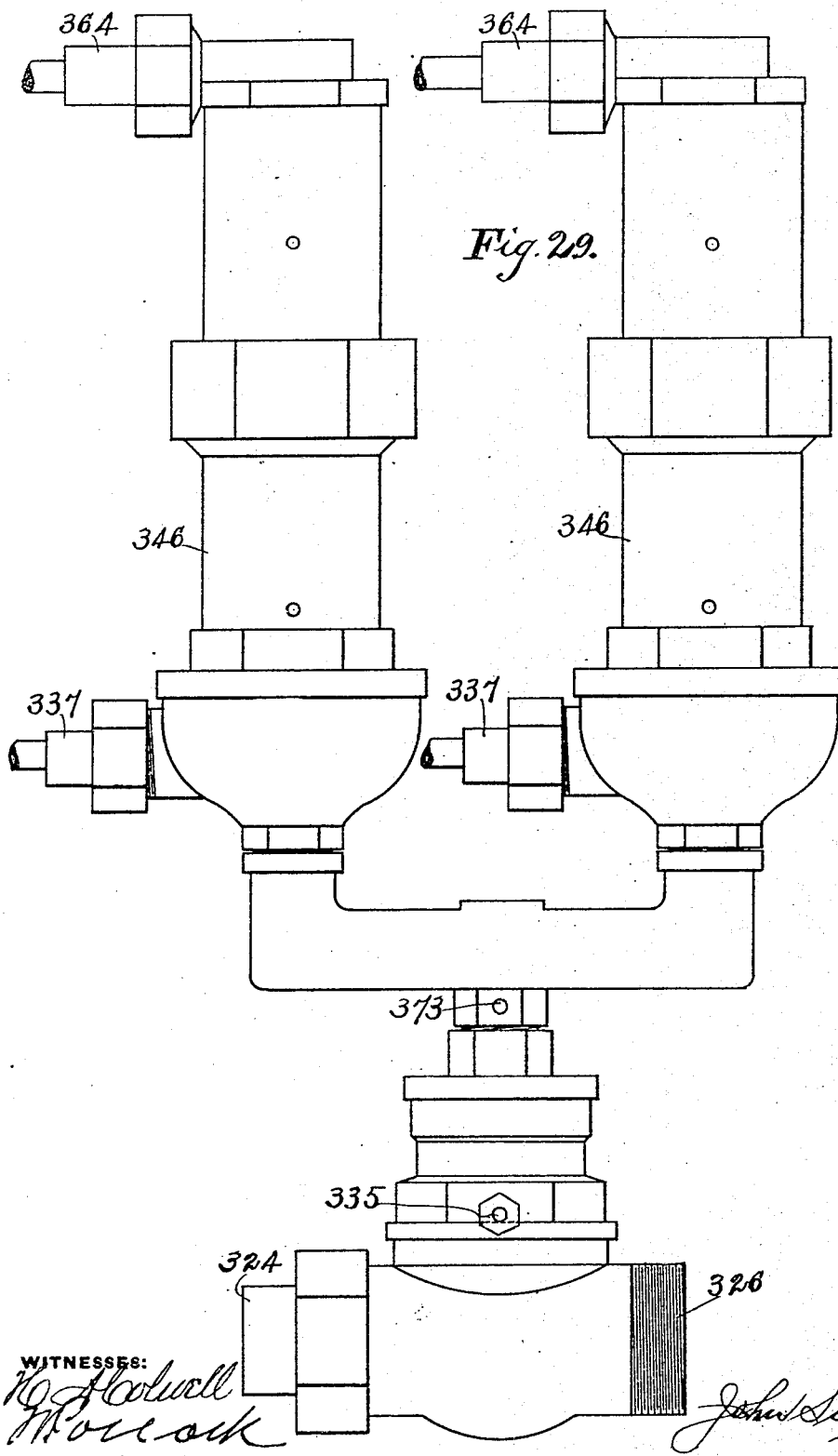

No. 787,723. Patented April 18, 1905.

UNITED STATES PATENT OFFICE.

JOHN SCOTT BUBB, OF KITTANNING, PENNSYLVANIA.

QUICK-ACTION AUTOMATIC FLUID-PRESSURE BRAKE SYSTEM.

SPECIFICATION forming part of Letters Patent No. 787,723, dated April 18, 1905.

Application filed December 29, 1904. Serial No. 238,733.

*To all whom it may concern:*

Be it known that I, JOHN SCOTT BUBB, a citizen of the United States, residing at Kittanning, in the county of Armstrong and State of Pennsylvania, have invented a new and useful Improvement in Quick-Action Automatic Fluid-Pressure Brake Systems, of which the following is a full, clear, and exact description.

My invention described herein relates to certain improvements in a quick-action automatic governor fluid-pressure brake system, an automatic regulating mechanism to compress air under pressure from the atmosphere and discharge the same into the system, an automatic device to admit the flow of pressure from the main reservoirs through the main train or brake pipe into the auxiliary reservoir and brake-piston cylinder, and main-service-valve chamber on each car or vehicle, and automatic governor valve devices attached thereto to govern the fluid under pressure in the main train or brake pipe, and the brake-piston cylinder; also, duplex governing devices to govern the fluid-pressure in the main train or brake pipe and the brake-piston cylinder, of governing devices to govern the pressure in the brake-piston cylinder under each car or vehicle; also, of devices to indicate the pressure in the brake-piston cylinder after the main service slide-valve has been shifted to a released position; also, automatic governing duplex devices to compress fluid under pressure and discharge the same into the brake system.

It is a further object of my invention in a fluid-pressure brake system to provide certain devices in combination, so that air will be drawn from the atmosphere by automatic regulating devices operated by steam under pressure and discharging the air under pressure into reservoirs, controlling, regulating, and indicating devices, main train or brake pipe, and the brake apparatus on each car or vehicle to any predetermined point of pressure desired equal to the normal fluid under pressure in the said system or to any excess of fluid under pressure desired in the system operating on devices to simultaneously close the exhaust-passage leading from the brake-piston cylinder to atmosphere and admit such excess pressure into the said brake-piston cylinder to perpetuate an application of the brakes any length of time desired after the main service slide-valve has been shifted to a released position, automatic devices within reach of the engineer to control the flow and indicate the fluid under pressure passing through the system to the air-brake apparatus on each car or vehicle, either when normal or excess of fluid under pressure is in the main train or brake pipe at a service application of the brakes or to perpetuate an application after the main service-valve has been shifted to a released position; also, to regulate and indicate the fluid under pressure in each brake-piston cylinder on each car or vehicle at a time when the excess pressure is operating devices to close the exhaust-passage leading from the brake-piston cylinder to the atmosphere and simultaneously governing devices are being shifted in the air-brake apparatus on each car or vehicle to regulate the fluid under pressure in the said brake-piston cylinder, so that the engineer knows just what pressure there is in the said brake-piston cylinder by the indicating means on the locomotive when a perpetuation of brake application is being had; also, duplex devices within reach of the engineer to change the fluid to any point of pressure desired passing through the system; also, duplex devices so adapted that when steam-pressure is admitted into the chambers of such devices the air passing through the system may be increased to that of boiler-pressure.

It is a further object of my invention to provide means on each car or vehicle of greater refinement to control and regulate the fluid under pressure in the main-service-valve chamber and passages connected therewith than in my cases Serial Nos. 147,042 and 198,934.

It is a further object of my invention to provide automatic means that may be located in any position on a car or vehicle that will control or regulate the fluid under pressure in the main-service-valve chamber and passages connected therewith to any point of predetermined pressure desired.

It is a further object of my invention to provide automatic means that may be placed in any position on a car or vehicle that will close the exhaust-passage leading from the brake-piston cylinder to the atmosphere any time when the main service slide-valve is in a released position and to simultaneously charge the said brake-piston cylinder with fluid under pressure to any predetermined point desired in order to perpetuate an application of the brakes.

It is a further object of my invention to provide automatic means within reach of the engineer to control the fluid under pressure simultaneously in the main train or brake pipe and the brake-piston cylinder when an application of the brakes is being perpetuated.

It is a further object of my invention to provide automatic means on each car or vehicle to simultaneously control the fluid-pressure in the main-service-valve chamber and auxiliary reservoir and to open a passage, so that any excess pressure in the said main-service-valve chamber and auxiliary reservoir may flow into the brake-piston cylinder after the main service-valve has been shifted to a released position.

It is a further object of my invention to provide means to admit live steam from the boiler of the locomotive into the main train or brake pipe and brake-piston cylinder in case there is a shortage of air-pressure in the system to perpetuate an application of the brakes after the main service-valve has been shifted to a released position.

Figure 2:
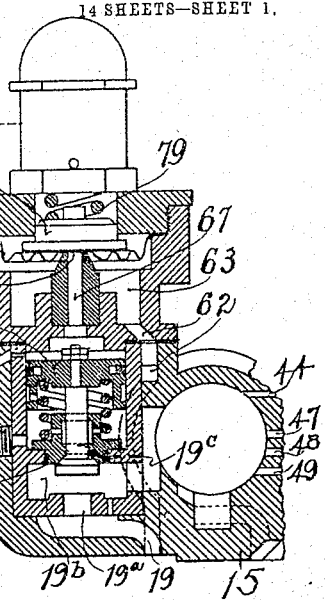
Figure 9:
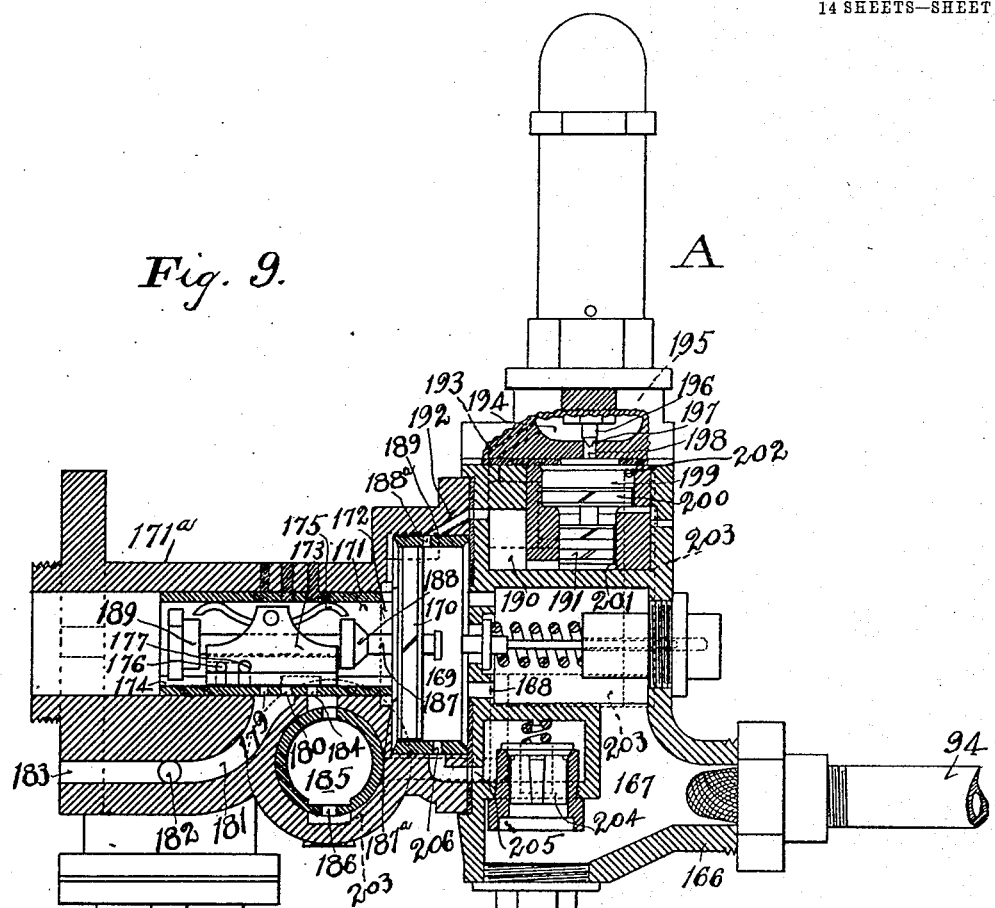
Figure 10:
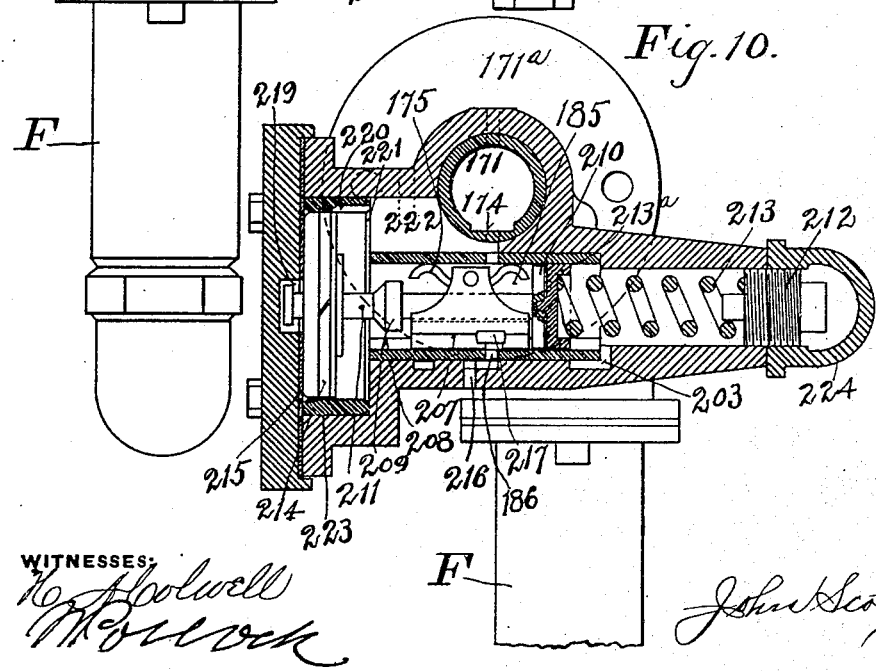

Figure 1 is a view, partly in elevation and partly in vertical central section, of an automatic regulating mechanism to compress air under pressure and discharge the same into the air-brake system. Fig. 2 is a view of the governing devices shown in Fig. 1. Fig. 3 is a view of a vertical central section at right angles of Fig. 1, showing in elevation a pipe leading to the main reservoir from the piston-chamber that compresses the air under pressure, also in elevation a pipe leading from the boiler of the locomotive to the mechanism and another pipe in elevation fitted with a valve leading to the equalizing-reservoir shown in Fig. 5. Fig. 4 is a side elevation of the bushing on the line X X of Fig. 3. Fig. 5 is a vertical central section view of the device that communicates the main reservoir with the main train or brake pipe, showing the main reservoir attached in elevation, also the indicating-gage in elevation, also the automatic governing-valve devices in elevation controlling the fluid under pressure in the brake-piston cylinder, also the equalizing-reservoir in elevation. Fig. 6 is a top plan view of the automatic governing devices to regulate the pressure in the brake-piston cylinder, same as shown in Fig. 5. Fig. 7 is a view, partly in elevation and partly in section, showing the duplex automatic governor-valve, partly in section, of the device shown in Fig. 5, also showing the indicating-gage in elevation, also the equalizing-reservoir in elevation with pipes connected thereto. Fig. 8 is a plan view of the end of the governor-valve device controlling the fluid-pressure in the brake-piston cylinder, as shown in Fig. 6. Fig. 9 is a longitudinal view of the main valve apparatus on each car or vehicle, showing in elevation the reducing-valve device, also the governor-valve device controlling the fluid in the main-service-valve chamber. Fig. 10 is a transverse sectional view on the line of the retaining-valve chamber in Fig. 9, showing the reducing-valve in elevation broken away. Fig. 11 is a transverse sectional view on the line of the governing-valve device shown in Fig. 9. Fig. 12 is a top plan view of Fig. 11. Fig. 13 is an end view in elevation of Fig. 9, removing the end chamber shown in Fig. 11. Fig. 14 is a view, partly in elevation and partly in section, showing the automatic governor-valve, partly in section and partly in elevation, that governs the fluid under pressure in the main-service-valve chamber and auxiliary reservoir. This figure is a modification of Fig. 9. Fig. 15 is a view, partly in elevation and partly in section. The section portions are those of the automatic devices shown in Fig. 14 in a central transverse position. Fig. 16 is a view in elevation of the modifications of Figs. 9, 10, 11, 12, 13, 14, and 15, showing the automatic governor-valve in elevation over the end chamber like shown in Figs. 14 and 15, and the retaining-valve mechanism on the top central portions of the figure, also an elevation view on the under side of the main casting of the reducing-valve shown in section in Fig. 22, also an end view of the retaining-valve casting. Fig. 17 is a view in elevation of a modification of Fig. 5, substituting a taper valve for a rotary valve, also showing in elevation the indicating-gage and the automatic governors to govern the fluid-pressure in the brake-piston cylinder and the main train or brake pipe when a brake application is being perpetuated. Fig. 18 is a view, partly in elevation and partly in section, showing in elevation the face of the retaining-valve chamber, which being the opposite side of the casting shown in Fig. 15, also showing the modification of the retaining-valve mechanism B, partly in section and partly in elevation, also the reducing-valve F in elevation. Fig. 19 is a view in elevation of the auxiliary reservoir and brake-piston cylinder on each car or vehicle. Fig. 20 is a view, partly in elevation and partly in section, of the main valve on each car or vehicle, showing in elevation the retaining-valve mechanism and reducing-valve device, also in section a modification of the governing devices shown in Figs. 9, 11, 14, 15, 16, and 18. Fig. 21 is a vertical central sectional view of the governing devices shown in Fig. 20. This figure is a modification of the governing devices in Fig. 20. Fig. 22 is a view, partly in elevation and partly in section, of the main valve on each car or vehicle, which is a modification of Figs. 9 and 10, 13, 14, and 15, 18 and 20, and also a transverse sectional view of the reducing-valve shown in Fig. 16. Fig. 23 is an elevation view of a duplex mechanism to compress fluid under pressure and automatically governing itself. Fig. 24 is a view, partly in elevation and partly in vertical central section, of a device to control fluid under pressure to any predetermined point desired in the system. Fig. 25 is a modification of Fig. 24, showing the top portions in elevation, and the lower vertical central section are the parts that are modified. Fig. 26 is a view, partly in elevation and partly in section, of Fig. 25, showing the leakage or drainage pipe from the piston-chamber. Fig. 27 is a view, partly in elevation and partly in section, of Fig. 24, showing the leakage or drainage pipe from the piston-chamber. Fig. 28 is a view in elevation showing a modification of Figs. 1, 2, and 3, substituting automatic duplex governor-valve devices. Fig. 29 is a view in elevation of duplex governing devices, as shown in section in Fig. 24.

For general purposes and convenience of description and regardless of position the automatic governor-valve device lettered H governs or regulates the live steam that operates the steam-piston 3, (see Fig. 1;) also, the automatic governor-valve device lettered V governs the fluid under pressure in the main train or brake pipe and the brake-piston cylinder; also, the automatic governor-valve device lettered P governs the pressure in the main train or brake pipe and the brake-piston cylinder to a certain fixed point of predetermined pressure; also, the automatic governing-valve device R governs the fluid-pressure in the main train or brake pipe and brake-piston cylinder to a predetermined point of pressure above that of P; also, the automatic governing-valve device lettered T governs the fluid-pressure in the main train or brake pipe and the brake-piston cylinder to a predetermined point of pressure above that of P and R; also, the automatic governor-valve device X governs the fluid-pressure in the main train or brake pipe and the brake-piston cylinder to a predetermined point of pressure above that of P, R, and T; also, the automatic governor-valve device lettered A governs the fluid-pressure in the main-service-valve chamber and auxiliary reservoir; also, the automatic governor-valve B governs the fluid-pressure to be admitted into the retaining-valve device; also, the automatic governor-valve device lettered F governs the fluid-pressure to be reduced in the passages in the main valve on each car or vehicle, which passages lead to and communicate with the brake-piston cylinder.

My invention consists in a quick-action fluid-pressure brake system having automatic regulating devices to compress the fluid under pressure to any predetermined point desired, a device operated by the engineer which gives him complete control of the air-brake system, device for indicating the pressure as it passes through the system, devices for automatically regulating the pressure on each car or vehicle, so that the engineer knows the pressure in the brake-piston cylinder after the main service-valve has been shifted to a released position, of devices whereby the engineer is enabled to charge the air-brake system from the boiler of the locomotive with live steam, and of duplex devices that also enables the engineer to change at will the fluid-pressure in the main train or brake pipe and the brake-piston cylinder, and of a main train or brake pipe and auxiliary reservoir, a main service-valve, and a brake-piston cylinder and one or more automatic governor-valves, and also modifications of several parts whereby more perfect action and simplicity of construction is secured.

In my improved quick-action automatic fluid-pressure brake system the devices to compress fluid under pressure is shown in Fig. 1. The main-steam-piston cylinder 1 is placed above the air-cylinder 2 and the main steam-piston 3 connected, by means of a piston-rod 4, with the piston 13, that compresses the air under pressure, the latter, however, being shown only in Fig. 3. The piston-rod 4 has formed within it a central bore 5 to receive the valve-stem 7, which is connected to an auxiliary slide-valve 8, which may be termed the "reversing" slide-valve. This reversing slide-valve 8 is fitted in a bushing 12, which bushing is fitted in a central chamber formed in an upward extension of the head 15 of the main-steam-piston cylinder. The reversing slide-valve is connected to the stem 7, being fitted between the shoulders 10 and 11 thereon, so that the valve and the stem move together. The stem 7 extends into the steam-cylinder and through the opening 16 in the plate 6 into the bore 5 of the piston-rod 4. When the main steam-piston 3 moves upward, the reversing-plate 6 comes in contact with the shoulder 9, formed on the stem 7, and moves the slide-valve 8 in an upward direction, and when the main steam-piston moves back or down and approaches the opposite end of its stroke the plate 6 comes in contact with the collar 14, formed on the end of the stem 7, and moves the reversing slide-valve downward or in the opposite direction. The steam-pipe 17$^a$ from the boiler supplies the live steam through the nozzle or connection 17. Then the live steam passes through the passage 18, formed in the wall of the steam-cylinder, the passage 19, formed in the cylinder-head 15, the port 19$^a$, and the automatic governor-valve chamber 19$^b$, passage 19$^c$, and port 20 in the bushing 21 into the chamber 22, in which the main slide-valve 23 is located. The governor-valve chamber 19ᵇ will hereinafter be explained. The main slide-valve 23 controls the ports 24, 25, and 26, through which steam is admitted to and exhausted from the two ends of the main steam-cylinder 1 for the purpose of moving the main piston 3. The main slide-valve 23 is fitted between two shoulders on the piston-stem 27 of the differential pistons 28 and 29, so that the pistons and the main slide-valve move together. As shown in the drawings, the piston 29, which is the larger of the two differential pistons, is fitted in one end of the bushing 21, and the other piston, 28, is fitted in the cap 30, which closes one end of the chamber 22; but both pistons may be fitted in the bushing 21 or in a chamber 22 without a bushing, or the piston 29 may be fitted in the cap 31 in the same manner as the piston 28 is fitted in the cap 30. The outer end of the chamber 32 in the cap 30 is in open communication at all times with the exhaust-passage 26 by means of the passage 33, formed in the cap 30, the annular passage 34, formed in the inner end of the cap 30, the passage 35 in the bushing 21, (see Fig. 4,) and the passages 36 and 37, which open into the exhaust-passage 26. The outer side of the smaller piston 28 is exposed at all times to the pressure in the exhaust-passage 26. The space between the two pistons 28 and 29 is at all times exposed to the pressure in the live-steam passages 18 and 19 and through the governor-port 19ᵃ and chamber 19ᵇ and passage 19ᶜ, and the outer end of the larger piston 29 is opposed to the pressure of steam, which is admitted to and released from it by the reversing-valve 8, as hereinafter explained. The main-slide-valve chamber 22 is always in open communication with the reversing-valve chamber 45 by means of the port 43 in the bushing 21, the passage 44, and the port 46 in the bushing 12. The reversing-valve 8 controls the three ports 47, 48, and 49, formed in the bushing 12, said ports connecting, respectively, with the passages 36, 40, and 38, formed in the outer side of the bushing 21. The passage 36 in the bushing 21 communicates with the exhaust-passage 26 by means of the passage 37. The passages 38 and 40 both communicate, by means of the ports 39 and 41, with the space at that end of the chamber 22 which is closed by the cap 31. When the reversing-valve is in the lower position, (shown in Fig. 1,) the port 49 is closed, and the cavity 42 in the face of the reversing-valve, by connecting the port 48 with the port 47, connects the passage 40 with the passage 36, and thereby opens communication from the outer end of the piston 29 to the exhaust-passage 26. The outer face of each piston is then exposed to the pressure in the exhaust-passage 26, and their inner faces are exposed to the live steam in the valve-chamber 22 between the pistons. Therefore since the piston 29 has a larger area exposed to the action of the live steam than the piston 28 has the two pistons 28 and 29 and the main slide-valve 23 will be moved to the right, as shown in Fig. 3, or toward the cap 31. Before reaching the outer end of its stroke the piston 29 closes the port 41, and thereby confines a portion of the exhausting steam between the piston 29 and the cap 31. The port 41 is purposely formed a short distance from the end of the bushing 21, so that it will be closed by the piston before all the steam has been exhausted from the end of the chamber in order that the portion of steam thus confined may act as a cushion to the piston 29 as it approaches the end of its stroke. The movement of the piston 29 to the outer end of its stroke moves the main slide-valve in the same direction and opens the port 24, thereby admitting live steam to the under side of the main steam-piston 3 and exhausting the steam from the upper side of the main piston 3, through the passage 25, the cavity 50 in the bottom of the main slide-valve, and the exhaust-passage 26, thereby causing the main steam-piston 3 to move upward. When the main steam-piston approaches the upper end of its stroke, the plate 6 comes in contact with the shoulder 9 on the stem 7 and effects the upward movement of the reversing-valve 8, in which movement the reversing-valve 8 first closes the port 48 and cuts off communication between the port 41 and the exhaust-passage 36, and as the valve moves farther upward it opens the port 49, through which live steam passes into the passage 38 in the bushing 21 and through the port 39 into the space at the outer side of the piston 29. The steam thus admitted to the piston 29 overbalances the steam-pressure on the inner side of the same piston, and the pressure of the live steam on the inner side of the smaller piston 28, being opposed only by the pressure in exhaust-passage 26 acting on the outer side of piston 28, causes the pistons and the slide-valve 23 to move toward the head 30 or to the left and places the passage 24 from the lower end of the main steam-cylinder 1 in communication with the exhaust-passage 26 through the cavity 50 in the bottom of the slide-valve 23. At the same time the port 25 is open and permits live steam to pass from the chamber 22 to the upper end of the main steam-cylinder 1, thereby causing the main steam-piston 3 to move downward. When the main steam-piston 3 approaches the lower end of a stroke, the plate 6 comes in contact with the collar or shoulder 14 on the stem 7 and moves the reversing-valve 8 down into the position shown in Fig. 1. The supply of steam to the space at the outer side of the piston 29 is then cut off and that space is put in communication with the exhaust-passage 26, which permits the pressure of the live steam on the inner face of the piston 29 to move the two pistons 28 and 29 and the slide-valve 23 so as to first cut off the exhaust from the lower side of the main piston and then open the port 24 to admit live steam to the lower side of the main piston 3 and at the same time connect the passages 25 and 26 through the cavity 50 in the bottom of the slide-valve 23, so as to open the upper side of the main steam-piston 3 to the exhaust-passage 26. The main steam-piston 3 then moves upward as before. In order to hold the reversing-valve 8 down in position shown in Fig. 1 and prevent its being moved upward before the plate 6 strikes, the shoulder 9 at the upper end of the stem 7 is exposed to live-steam pressure in the chamber 51 when the main piston 3 is moving upward. The chamber 51, which is formed in the cap 52, communicates, by means of the passage 53, with an annular groove 54, formed around the outside of the upper edge of the reversing-valve-chamber bushing 12. This annular groove is connected by means of a longitudinal groove (not shown) formed in the outside of the bushing 12 within another annular groove, 55, formed around the lower end of the reversing-valve-chamber bushing 12, and the annular groove 55 is connected with the passage 24 by means of a passage 56, (not shown,) formed in the cylinder-head. The chamber 51 will therefore always be exposed to the pressure in the passage 24 and below the main steam-piston 3, and when the main steam-piston 3 is moving upward the piston-stem 7 will be held down by live-steam pressure in the chamber 51 acting on its upper end against the pressure of the exhaust-pressure acting on the other end. When the main steam-piston 3 is moving downward, the chamber 51 and the under side of the main steam-piston 3 are exposed to the pressure in the exhaust-passages. The reversing-valve 8 is then in its upper position and is held up by the steam-pressure in the space above the main steam-piston 3 acting on the lower end of the stem against the pressure of the exhaust to which the upper end of the stem 7 is then exposed. The air-piston 13, moving up and down in the air-compressing cylinder 57, draws air from the atmosphere through the screen 58 and the valves 59 (see Fig. 3) and forces the air under pressure into and through the valves 60 into the chamber 61 and the passage 62, as hereinafter explained. From the chamber 61, which always has air compressed to a certain predetermined point of pressure, leads the pipe 63 to the main reservoir 64, as hereinafter explained. As soon as a predetermined fluid-pressure has been attained in the main reservoir 64 and the chamber 61 and the connecting-passages, as above described, and also in the passage 62 and the flexible diaphragm-chamber 63 of the automatic governor-valve mechanism H the fluid under pressure from said passages and chambers will raise the flexible diaphragm 64, and with it the governor pin-valve 65, from its seat 66, and thereby permit fluid under pressure to flow from the flexible-diaphragm chamber 63 into the passage 67 and thence into the automatic governor-piston cylinder 72, where such fluid-pressure will operate upon the automatic governor-piston 69 and force the governor-valve 73 down on its seat 71, closing the port 19$^a$ and preventing any further flow of live steam under pressure from the passages 18 and 19 into the chamber 22. A leakage-port 68 leads from the passage 67. It allows of the opening of the valve 73 by permitting the escape to atmosphere of steam under pressure in the rear of the piston 69. The valve 73 is connected to a stem 70, having a packing-ring 74, said stem moving through a bore or guideway 75, carrying an automatic governor-piston 69 and provided with suitable packing-rings 76 and arranged within a governor-piston cylinder 72. The valve 73 of the governor is normally held away from its seat 71 by a spring 77, which is interposed between the automatic governor-piston and the end of the governor-piston cylinder. The head of the power end of the cylinder 72 of this automatic governor-valve mechanism is recessed, forming a cylinder for the reception of the packing-piston 74, which is adapted to prevent the loss or flow of fluid under pressure through the live-steam passages in the head 15. The upper end of this automatic governor-piston cylinder 72 communicates by a passage 67 with the flexible-diaphragm chamber 63, said chamber having a flexible diaphragm 64, carrying, in a manner hereinafter described, the automatic governor pin-valve 65. The flexible-diaphragm chamber 63 is connected by a passage 62, which passage 62 leads from chamber 61, (see Fig. 3,) so that the air compressed under pressure by the piston 13 through the valve 60 and into chamber 61 will flow through the passage 62 into the flexible-diaphragm chamber 63. This automatic governor pin-valve 65, which is carried in the center of the disk hub 78 and in the center of the flexible diaphragm, is normally held to its seat 66 by an automatic governor-regulating spring 79, which bears against the disk hub 78 and has its tension so adjusted by a screw-plug 80 in the opposite end of the governor-spring chamber 81 as to hold the automatic governor pin-valve 65 against its seat 66 until a certain predetermined fluid under pressure—say ninety pounds—has been attained in the chamber 61, pipe 63, and main reservoir 64, and chamber 95. When such fluid under pressure has been attained, it overcomes the tension of the governor-spring 79 by the fluid under pressure against the flexible diaphragm, and by lifting the valve 65 from its seat 66 fluid under pressure is allowed to pass under ninety pounds of fluid under pressure against the piston 69, which will close the valve 73 and shut off the flow of live steam through the passages into the slide-valve chamber 22 until the fluid under pressure in the main reservoir 64 and chambers connected therewith may have been reduced below the predetermined point of ninety pounds or normal main-reservoir pressure. When the fluid under pressure in the said reservoirs and pipes has been reduced, the automatic governor-spring 79 will again close the valve 65, and the fluid under pressure being removed from the piston 69 the spring 77, with the fluid under pressure against the piston 73 flowing through the passages 18 and 19 of the steam-supply, will raise the piston and again open the valve 73, which will remain open until the fluid under pressure in the main reservoirs, pipe 63, and chamber 61 and passages 62 is at the normal fluid main-reservoir pressure. As soon as this fluid under pressure in the main reservoirs, pipe 63, and chamber 61 and passages connected therewith is at normal the valve 73 closes and prevents any excess fluid-pressure above that of normal or any reduction in the main reservoirs. As shown in Fig. 1, the edges of the flexible diaphragm 64 are clamped under an inward spherical taper ring 82 between shoulders on the walls 83 of the fluid-chamber 63, which is formed at the base of the governor-spring chamber 81. The spherical taper ring is so adapted to admit of a spherical or central movement of the flexible diaphragm when fluid under pressure is exerted against the lower side of the flexible diaphragm to open a valve. The automatic governor pin-valve 65 passes loosely through a thimble-nut 84, the latter having a threaded stem, passes up through the center of the flexible diaphragm, and screws into the center of the disk hub 78, which disk hub is guided in its movements up and down by the side of the governor-spring chamber 81 and the spherical taper ring 82. The upper end of the automatic governor pin-valve 65 is provided with a head 85, arranged in a disk hub 78, and is held by a spring 86 against the upper end of the recess. By this construction wear will be compensated for and the automatic governor pin-valve 65 will be allowed to accommodate itself to its seat 66, tightly closing the upper end of the passage 67. For general purposes and convenience of description I designate this apparatus or device as the "automatic governor-valve" H.

The operation of the automatic governor-valve mechanism H will be readily understood from the foregoing description of the parts, as it governs all that fluid under pressure compressed into the chamber 61, pipe 63, and the main reservoir 64 and chamber 95 and any other passages connected therewith.

In Fig. 2 I show a modification of the governor-valve device H, as shown and described in Fig. 1, by substituting or omitting the pin-valve 65 and allowing the flexible diaphragm to close the passage 67 by seating on the seat 66 and also by substituting the valve 87 for the piston 74. Leading from the chamber 72 is a waste-pipe 88 to allow any steam that may leak into the chamber to flow to the atmosphere. From the steam-pipe 17$^a$ leads a pipe 89, which pipe 89 leads into the equalizing-reservoir 90. (See Fig. 5.) In the pipe 89 is what is termed a "taper valve" 91. This valve is adapted to admit live steam from the steam-pipe 17$^a$ through the pipe 89, into the equalizing-reservoir 90, and thence into the brake system, as hereinafter described.

In Fig. 5 I show a device to admit compressed air from the main reservoir 64 into a fluid-pressure brake system and to control means to discharge such pressure to atmosphere at the will of the engineer to make an application of the brakes, means in such device to increase the fluid-pressure in the main train or brake pipe and the brake-piston cylinder after the main service-valve on each car or vehicle has been shifted to a released position and also to govern such fluid-pressure in the brake-piston cylinder and the main train or brake pipe, also means to indicate the pressure both in the brake-piston cylinder and the main train or brake pipe. From the main reservoir 64 leads a pipe 92 and is connected to the lower section 93, and the lower section 93 is also connected by means to the main train or brake pipe 94. The pipe 96 connects the lower section with the equalizing-reservoir 90 and with the indicating-gage lettered G, as hereinafter described, and also the chamber 95 connects with the indicating-gage G to indicate the fluid under pressure in the main reservoir. On the section 93 is placed a train-line governor-plate 97, and resting on the plate 97 is the middle section 98. Resting on the middle section 98 is the brake-piston-cylinder governor-plate 99. Resting on the plate 99 is a top section 100, which incloses the device. Gaskets of suitable material are placed between the sections as they are bolted together to prevent leakage. The train-line governor-plate 97 has a valve-seat 101 formed on a projection on its upper side. The main train-line rotary valve 102 rests on this valve-seat and is inclosed by the middle section 98 and the plate 99 and the top section 100. The air under pressure flows from the main reservoir 64 through the pipe 92 and the chamber 95, through the passage 103 into chamber 104, thence through the passage 105 in the valve-plate 99 into the chamber 106. On the upper side of the brake-piston-cylinder governor-plate 99 is a seat 107, formed, and a rotating valve 108, as hereinafter explained. It will be seen that with this improved construction the different sections may be easily and quickly taken apart for the purpose of examining or repairing the parts without breaking any of the pipe connections by which the controlling device is connected with the main reservoir, the main train or brake pipe, the equalizing-reservoir, or the gages for indicating the pressure in the main train or brake pipe and the brake-piston cylinder, and also the multiple governor devices attached may be repaired in a similar manner. When the upper or cap section 100 is removed, the valve-seats 101 and 107 being raised above the other part of the section are more easily examined and repaired, and the joints between the valve-seats 101 and 107 are exposed, so that any defects in the fit of these parts may be readily discovered. In both cases if it becomes necessary to grind or otherwise repair the valve-seat it will be much more convenient to do so when the valve-seat is formed on a projection, as shown on the plates.

In the lower section 93 is formed a chamber 109, in which is fitted a piston or a flexible diaphragm 110, to which is connected a valve-stem 111, on the lower end of which is a discharge-valve 112, which controls the outlet-passage 113, opening from the pipe 114 to the atmosphere. The pipe or passage 114 is always in communication at its lower end with the main train or brake pipe and at its upper end with the chamber 109, below the piston 110, so that the piston 110 is at all times exposed on its lower side to the fluid under pressure in the main train or brake pipe. The chamber 115 on the upper side of the piston 110 communicates through a passage 116, which leads to a small equalizing-reservoir 90, hereinafter described. The gasket between the section 93 and the train-line governor-plate 97 extends partly over the chamber 115, so as to form a seat for the piston 110 when it is in its upper position. The valve-seat 101 has two ports or passages 116ª and 117, which extend downward and open in the chamber 115, a port 118, which extends downward and opens into the passage 119 and thence into the pipe 114, and the port or passage 120 (not shown) is open to atmosphere. The port 121 (see Fig. 7) extends downward and connects with the passage 122, which leads to an automatic governor-valve passage 123, as hereinafter explained, (see Figs. 14 and 15,) for controlling the fluid-pressure flowing through passage 124 and connecting with the passage 119, which is always in communication with the main train or brake pipe.

The automatic governor-valve V referred to automatically regulates the supply of air to the main train or brake pipe when the brakes are in what is called the "released" position or termed the "running" position. The governor-valve is one of a multiple type—that is, after the regulating-spring has been adjusted to a certain predetermined point of pressure, say seventy pounds, while this pressure is fixed a manipulation of the device will increase the tension of pressure on the governor-spring, so that any predetermined amount of pressure may be had in the main train or brake pipe and simultaneously in the brake-piston cylinder, so that the indicating-gage will indicate what pressure has been regulated. When the brakes are released and all the parts in condition to permit the running of the train, it is necessary to maintain in the main train or brake pipe a maximum pressure, which is usually referred to as the "normal" main train or brake pipe pressure. After the main train or brake pipe has been charged to release the brakes the train-line rotary valve 102 is placed in the second position, so that the feed-port supplying air to flow through the governor valve mechanism or device V registers with the connecting-port in the seat 101 and permits air from the main reservoir to flow through the passages connected with 119 and through the passage 114 to the main train or brake pipe. My improved multiple regulating or governor valve device V permits the flow of air from the main reservoir to the main train or brake pipe so long as the main train or brake pipe pressure is below the desired and predetermined maximum, but closes and cuts off the flow from the main reservoir as soon as this maximum pressure is obtained in the main train or brake pipe, such closure of the regulating or governor device being independent of the pressure in the main reservoir. If the fluid-pressure in the main train or brake pipe becomes reduced from any cause below the proper maximum pressure, the regulating or governor valve device is automatically opened to permit the flow from the main reservoir and again closed when the main train or brake pipe is charged to the pressure desired. The train-line valve-handle 125 is secured to the stem 126, on the lower end of which is formed a key 127, projecting from the stem and engages in the slot 128 on the back of the rotary valve 102. In the key 127 is formed a spring 129, adapted so as to be interposed at the lower end in the slot on the back of the rotary valve 102 and in the chamber formed in the stem 128 at the upper end, holding tightly closed the passage 130, by means of a packing-disk 131, to prevent any escape of pressure from the chamber 104 to atmosphere. The movement of the rotary valve 102 is well understood in the art and will not be explained. The valve-handle 132 is secured to the pipe-stem 133, on the end of which is formed the disk 134, between which and the upper section-cap 135 is placed a suitable packing to prevent leakage around the stem. A key 136, projecting from the disk, engages with a slot 137 in the back of the rotary valve 108, by which the movement of the handle is communicated to the valve. Leading from the chamber 104 is a port 139, through the valve 108, which port communicates with passage 140, which leads to the inlet-passage 141 of the automatic governor-valve device P, as hereinafter described, and flows through the governor-valve device, thence through passage 142 into passage 143, which passage communicates with passage 144 in the brake-piston-cylinder governor-plate, leading thence into passage 145, which communicates with passage 116, the latter communicating with the main train or brake-pipe. The rotary valve 108 has ports 146, 147, and 148. (Not shown.) Port 146 communicates with the passage in the plate 99 149. Said passage communicates with the governor-valve device R, through the port 150, and thence through the device and through port 151, communicating with port or passage 143. The rotary valve 108 has another port, 147, communicating with a passage 153 in the plate 99, which port 153 communicates with the governor-valve device T through passage 154 and thence through passage 155 into port or passage 143. The rotary valve 108 has another port, 148, which communicates with the passage 157 in the plate 99, which passage communicates with a port or passage 158, with the governor-valve device X, thence through a passage 159 into the passage 143, which passage, as above stated, communicates, through the passages 144, 145, 116, 117, 118, 119, and 114, to the main train or brake pipe 94. It is not necessary to show the ports leading from chamber 104 in section to the various governors, as P, R, T, and X, for the reason that the rotary valve 108 is rotated by the handle 132 so that the ports communicate with the respective passages that lead from the chamber 104 in and through each automatic governor-valve device, as shown in Fig. 6. The objects of these governors as they are placed are first, so that the governor-valve device P may communicate with the pressure from the main reservoir and with the main train or brake pipe and the brake-piston cylinder on each car or vehicle for the purpose of governing or regulating the pressure in the brake-piston cylinder after the main service-valve on each car or vehicle has been shifted to a released position and the retaining-valve device has closed the passage leading from the brake-piston cylinder to the atmosphere. The governor-valve P may be set under a predetermined amount of pressure — say eighty pounds — while the governor device R may be set at a predetermined point of pressure of ninety pounds, and the governor device T may be set at a predetermined amount of pressure of one hundred pounds, and the governor device X may be set at a predetermined point of pressure of one hundred and ten pounds. These pressures may be fixed in each governor-valve device, so that when the fluid-pressure in the chamber 104 communicates with the passages that lead to any of the respective governor-valve devices the pressure leading to any particular governor-valve will govern the pressure to be desired in the brake-piston cylinder on each car or vehicle, while such pressure is indicated by the indicating-gage G, so that the engineer knows the amount of fluid under pressure in each brake-piston cylinder on each car or vehicle during the time when the main service-valve has been shifted to a released position, and the fluid under pressure in the main-service-valve chamber and auxiliary reservoir is governed to any predetermined point of pressure desired — say to normal train-pipe pressure, or seventy pounds.

The parts that govern the pressure, as above stated, by the foregoing description will be readily understood, for the reason that it is only necessary for the engineer to move the handle 132 in a circular movement, so that the rotating valve 108 may open communication between the chamber 104 and any of the automatic governor-valve devices, as P R T X, so that he may have at any time the desired amount of fluid under pressure in the brake-piston cylinder on each car or vehicle. The equalizing-reservoir 90 is adapted to contain the same amount of fluid under pressure as that in the main train or brake pipe, and when the engineer desires to make an application of the brakes by a reduction of fluid under pressure he moves the handle 125, which operates or rotates the rotary valve 102, which places or communicates the equalizing-reservoir 90 with the atmosphere, and the number of pounds of air-pressure indicated by the gage G that the engineer takes from the equalizing-reservoir 90 the piston 110 takes from the main train or brake pipe by the valve 112 on the stem 111 opening the passage to atmosphere 113. The equalizing-reservoir 90 has another function, which a pipe 89 from the main steam-pipe 17$^a$ connects for the purpose of collecting the condensation from the steam that passes through the reservoir and the pipe 96, through the passage 119, into the main train or brake pipe in case the pressure in the main reservoir 64 is not great enough to perpetuate the desired application of the brakes through the means of an excess pressure of fluid in the main train or brake pipe to shift the main service-valve to a released position and open communications, through the retaining valve mechanism, with the brake-piston cylinder on each car or vehicle. In the pipe 89 there is an automatic governor device to regulate the steam flowing through and into the fluid-pressure brake system, as hereinafter described. The indicating-gage (lettered G) is adapted to indicate pressure in the main train or brake pipe and the brake-piston cylinder on each car or vehicle by the movement of the black hand, while the other hand indicates the pressure in the main reservoir-pipe 63, chamber 61, and passage 62 to the flexible diaphragm-chamber of the automatic governor-valve device H. (See Figs. 1 and 3.) In Fig. 7 I show an elevation view of the device shown in Fig. 5, with the automatic multiple governor device V attached to train-line governor-plate 97, partly in elevation and partly in section. The functions of the multiple governor-valve device V are similar to the automatic governor-valve device lettered A, (shown in section in Figs. 14 and 15,) omitting the second functions of the slide-valve in each figure and substituting duplex regulating means by which the automatic governor-spring 160 may be compressed to any point of pressure desired while rotating the handle 161 after the governor-spring 160 has been set by the screw-plug 162 to a predetermined point of pressure. As shown, the handle 161 is secured to the stem 163 for the purpose of making a circular movement of the threaded stem 163 in order to force the cap 164 and compress the governor-spring 160 to any point of pressure desired, which may be indicated by the black hand on the indicating-gage, (lettered G.) The handle 161 may be rotated so that the catch 165 will stop in any of the stops shown around the plate, as each stop may indicate a higher predetermined pressure of the automatic governor-valve device.

Fig. 8 is an end view of Fig. 6, showing the passages referred to connecting the main supply of air under pressure with the different automatic governor-valve devices P, R, T, and X.

If it is so desired, the multiple governor valve device V may be adjusted by the engineer to any pressure that he may desire in the main train or brake pipe and simultaneously in the brake-piston cylinder—that is, when he desires an excess pressure in the main train or brake pipe to operate the retaining-valve devices on each car or vehicle—so that he can close the exhaust-passage leading from the brake-piston cylinder to the atmosphere, and after said passage is closed the excess pressure in the main train or brake pipe will flow through the automatic retaining-valve device (lettered B) into the brake-piston cylinder. The equalizing-reservoir referred to may be used to have a reduction of pressure made therefrom to release the brakes when the application has been made by an excess pressure in the main train or brake pipe, as well as used for reducing the pressure therein to make an application of the brakes, while the former is done without shifting the main valve of the fluid-pressure brake system on each car or vehicle, while the latter shifts the valve in the device on each car or vehicle to make an application of the brakes. Also the controlling-valve device shown in Figs. 5 and 7 is adapted to release the brakes by reducing the pressure in the main train or brake pipe, as well as making an application by reducing the pressure in the main train or brake pipe.

In Fig. 9 I show a sectional view of the main valve device in the fluid-pressure brake system on each car or vehicle, showing the automatic governor-valve device A as in application, April 14, 1903, Serial No. 147,042, and in application, March 19, 1904, Serial No. 198,934, and also in elevation the reducing-valve F in the latter.

I show the main train or brake pipe 94 secured to the end casting 166 of the device forming the end chamber 167, from which chamber port 168 leads into the main-service-valve-piston porous or non-porous cylinder. In this piston-cylinder is a piston 170, adapted to be reciprocated by differences of pressure on opposite sides of the piston. The pores of the piston-cylinder are adapted to admit the flow of fluid under pressure from the main train or brake pipe directly to the brake-piston cylinder, independent of any other piston or flexible diaphragm, through the piston-cylinder 169, main-service-valve chamber 171, formed in the casting 171$^a$, into a passage leading to the brake-piston cylinder by a reduction of fluid under pressure in the main train or brake pipe sufficiently to cause an emergency application of the brakes, the piston 170 being shifted to its full movement in the porous piston-cylinder by fluid under pressure from the main-service-valve chamber and the auxiliary reservoir. Beyond the chamber 172 is a slide-valve chamber or main-service-valve chamber 171, in which is the main service slide-valve 173, held to its seat 174 by a spring 175. This slide-valve is provided with ports 176, 177, and 178 (latter not shown) and adapted to register with ports 179 and 180. The ports 179 and 180 are service and emergency ports, respectively leading to the passage 181, which connects with a passage 182, leading to the automatic duplex governor or leakage device and thence to passage 183, that leads to the brake-piston cylinder. The port 184 leads to the retaining-valve chamber 185, thence to the exhaust-passage 186. Secured to the piston-rod 187 are the collars 188 and 189, which collars are adapted to strike against the main slide-valve 173 and move it back and forth on its seat 174, so as to open and close the ports 179 and 180 and establish communication by these ports between the main-service-valve chamber, auxiliary reservoir, and reducing-valve chamber and the brake-piston cylinder for the purpose of making a service and emergency application of the brakes. The passage which leads from the main train or brake pipe to the main-service-valve chamber is provided with an automatic governor-valve device A, is so adapted to govern all that quantity of fluid under pressure in the main-service-valve chamber, auxiliary reservoir, and passages connected therewith, so that the fluid is under equal pressure in both chambers and passages at the same time, pressing against the inner face of the driving-piston, so that the automatic retaining-valve device may be operated without effecting the main service-valve mechanism, the purpose of which is to cut off communication between the main train or brake pipe and the main-service-valve chamber as soon as the fluid in the main-service-valve chamber has reached a predetermined pressure and to admit to the brake-piston cylinder, as hereinafter described, any fluid under pressure in the main-service-valve chamber and auxiliary reservoir above the normal fluid under pressure in said chamber and auxiliary reservoir. This communication established between the main-service-valve chamber and the brake-piston cylinder is to prevent the accumulation of any excess of fluid under pressure in the main service-valve chamber and auxiliary reservoir by leaking past the driving-piston 170 when the main train or brake pipe is charged with excess of fluid under pressure above the normal to operate the retaining-valve devices, closing the exhaust-passages from the brake-piston cylinder, and perpetuating an application of the brakes.

When the driving-piston 170 and the main service slide-valve mechanism operated thereby is in normal position to the left, the driving-piston 170 being forced to its seat 187ª by the fluid under pressure from the main train or brake pipe and the main service slide-valve cutting off communication between the main-service-valve chamber, reducing-valve chamber, the auxiliary reservoir, and the brake-piston cylinder, the fluid will pass from the driving-piston cylinder 169, through the port 188ª and passage 189, into the automatic-governor-valve chamber 190 of the governor-valve 191, thence by the passage 192 (in dotted lines) into the main-service-valve chamber 171. As soon as the predetermined fluid-pressure has been attained in the main-service-valve chamber and connecting passages above described and also in the passage 193 (shown in dotted lines) and in the flexible-diaphragm chamber 194 of the automatic governor-valve mechanism A the fluid under pressure from said passages and chambers will raise the flexible diaphragm 195, (not shown,) and with it the governor pin-valve 196, from its seat 197, and thereby permit fluid under pressure to flow from the flexible-diaphragm chamber 194 into the passage 198 and thence into the automatic-governor-piston cylinder 199, where such fluid under pressure will operate upon the automatic governor-piston 200 and force the automatic governor-valve 191 down on its seat 201, closing the passage 188ª and preventing any further flow of fluid under pressure from the main train or brake pipe through the driving-piston cylinder 169 to the main-service-valve chamber and auxiliary reservoir. A port 202 in the chamber 199 of the governor-valve mechanism leads into a passage 203, (in dotted lines,) which passage leads to the retaining-valve chamber 185. This port has double function—first, it allows of the opening of the valve 191 by permitting the escape to atmosphere through the retaining-valve chamber when the retaining-valve mechanism is open of fluid under pressure in the rear of the piston of the valve, and, secondly, it opens communication between the auxiliary reservoir, main-service-valve chamber, through the retaining-valve chamber into the brake-piston cylinder after the retaining-valve mechanism has been closed. Thus it will be seen and understood that any excess pressure above the normal in the auxiliary-reservoir main-service-valve chamber that may leak past the driving-piston 170 will flow into the brake-piston cylinder through the port 202 and passage 203, as above referred to. The check-valve 204 is adapted to admit fluid under pressure from the main train or brake pipe into the brake-piston cylinder through passage 205 and port 206 after the driving-piston 170 has been shifted its full movement in the piston-cylinder 169.

In Figs. 10, 13, 14, 15, 16, 18, and 20 I show either in section or elevation a duplex automatic governor retaining-valve feed-valve device adapted to retain, feed, or govern the fluid under pressure in the brake-piston cylinder, in which contains two automatic governor-springs, the one in the spring-chamber lettered B in Figs. 11, 16, and 18 and the other shown in section in Fig. 10. Each governor-spring is set under any predetermined point of pressure against a pressure-plate to resist the excess fluid under pressure from the main train or brake pipe. The first governor-spring, or that of B, is operated to admit the excess pressure from the main train or brake pipe into a chamber hereinafter specified to operate a pressure-plate against which the second governor-spring is compressed by the screw-plug, (shown in section in Fig. 10,) which governor-spring acts, in conjunction with the fluid under pressure from the brake-piston cylinder, against the inner side of the second pressure-plate. The same opens the exhaust-passage leading from the brake-piston cylinder to atmosphere when the fluid-pressure is reduced in the main train or brake pipe enough to close a passage that is controlled by the first governor device leading from the main train or brake pipe to the chamber of the second pressure-plate.

Fig. 10 is a transverse sectional view on a line of the duplex automatic governor-retaining-valve feed-valve-device chamber 185, formed in the casting 171ª, showing a slide-valve in the retaining-valve feed-valve chamber, which is of greater refinement than in my applications Serial Nos. 147,042 and 198,934, in which the retaining slide-valve 207 is adapted to be shifted on its seat 208, similar in all respects to the main service slide-valve 173 in Fig. 9. this slide-valve 207 is shifted on its seat 208 by the shoulders or collars 209 and 210 on the piston-rod 211. Between the shoulder 210 and the screw-plug 212 is a governor-spring 213, similar in all respects to the governor-spring in the governor-valve mechanism A, opposed at the one end by the screw-plug 212 and at the other a cap 213ᵃ, so that the piston 214 on the rod 211 may be compressed against the end chamber 215 to any predetermined point of pressure desired. When the slide-valve 207 is in its normal position, it communicates the exhaust-port 184 with the exhaust-port 286 and passage 216 through the port 217 in the slide-valve, which allows the fluid-pressure in the brake-piston cylinder to escape to atmosphere through underneath the groove in the main slide-valve 173. (Not shown.) The piston 214 is adapted to be reciprocated by difference of pressure on the inner side from the brake-piston cylinder and on the outer side or chamber 219 from the main train or brake pipe through the governor-valve mechanism B. (See Fig. 11.) Out of chamber 219 at the head end of the piston 214 leads a port or groove 220, which after the piston has been forced to its seat 221 the fluid under pressure from the main train or brake pipe through the governor-valve mechanism B flows through port 220 into passage 222, through the groove on the under side of the main service slide-valve 173 into the brake-piston cylinder, thus perpetuating an application of the brakes any length of time desired. The operations of this retaining-valve device will be readily understood from the foregoing description, for the reason that if the governor-spring 213 is set under a pressure of thirty-five pounds per square inch and the fluid-pressure in the brake-piston cylinder being forty pounds the combined pressure of the governor-spring and the fluid-pressure against the piston 214 will require a little in excess of the combined pressure—say seventy-six or more pounds—in order to shift the slide-valve 207, closing the exhaust-port 186 and passage 216 leading to atmosphere, which movement will admit of fluid under pressure from the main train or brake pipe through the governor-valve mechanism B and ports and passages described into the brake-piston cylinder so long as pressure flowing through the governor-valve mechanism B from passages that communicate with the main train or brake pipe or any other suitable source of supply and continue to flow until the pressure in the brake-piston cylinder exceeds the amount of forty pounds per square inch, at that time the piston 214 will be equalized between pressure, and thereby admitting fluid from the brake-piston cylinder to atmosphere, thus enabling any predetermined fluid under pressure in the brake-piston cylinder. It will also be understood that when the slide-valve 207 has been shifted to close the exhaust-passage 216 the governor-valve mechanism A has cut off communication between the main train or brake pipe and the main-service-valve chamber. When the excess pressure in the main train or brake pipe has become great enough to operate the retaining-valve mechanism, the cap 213ᵃ has a very slight bearing against the shoulder or collar 210, formed on the piston-rod 211, for the purpose of preventing the piston-rod 211 from turning in the chamber, as if it turns it might unseat the slide-valve 207. Between the slide-valve 207 and the shoulder or collar 209 there is a small space left for the purpose, so that the piston 214 may shift enough in its chamber to close the port 220 and not shift the slide-valve 207 to prevent the opening of exhaust-port 186, while the piston 214 is being equalized between pressures a port 223 is so adapted that any leakage through the governor-valve mechanism B may escape to atmosphere through the retaining-valve chamber and exhaust-passage 216. The check-nut 224 is so adapted to keep the plug 212 in position to any point it is set.

In Fig. 11 I show a transverse section of the end casting 166 on a line with the governor-valve mechanism A, as in Fig. 9. The automatic governor-valves A and B being in elevation, the automatic governor-valve mechanism B, as in applications Serial Nos. 147,042 and 198,934, from this governor-valve chamber 225 leads a passage 226, which communicates with port 227. (See Fig. 13.) This port leads into passage 228, thence into the chamber 219 of the retaining-valve mechanism.

In Fig. 12 I show a top plan view of the end casting 166 of Fig. 11, showing the piston-chamber 199 in the center and the port 202 and the passage 203 in dotted lines, also the chamber 226 and the passage 229, which passage leads out of the chamber 167 into chamber 225 of the governor-valve mechanism B. From the chamber 226 leads a passage 230, which passage communicates with port 227. (See Fig. 13.)

In Fig. 13 I show an end view in elevation of the main-valve casting 171ᵃ in the fluid-pressure brake system on each car or vehicle, showing in dotted lines the port 188ᵃ, leading out of chamber 188 into passage 189, which passage communicates with chamber 190, (see Fig. 9,) also passage 192, which passage leads to the main-service-valve chamber 171, also passage 203, which leads out of chamber 199, (see Fig. 9,) communicating the retaining-valve chamber through port 202 with the piston-chamber 199.

In Fig. 14 I show an end view, partly in elevation and partly in section, of the main valve-casting 171ᵃ of the fluid-pressure brake system on each car or vehicle, also the reducing-valve F in elevation, and a modified automatic governor-valve mechanism A, showing a central section through the supply-valve case. Out of passage 189 leads into a port 231, which leads into passage 232, which passage communicates directly with the slide-valve chamber 233. The chamber 233 is formed in a bushing 234, and at the one end a flush-nut 235, and at the opposite end or right end the chamber carrying the piston 236. The bottom of this slide-valve chamber has a seat 237 in all respects similar to the flat seat of the main-service-valve chamber 171. Chamber 238, which is separated from chamber 233 by the supply-valve piston 236, is connected with passage 239 (see Fig. 15) and port 240, which port communicates with the main-service-valve chamber 171 and also through passage 241 and port 242 (controlled by the regulating-valve 244) and chamber 243 over the flexible diaphragm 245. The regulating-valve 244 is normally held open by a flexible diaphragm 245 and the regulating or governor spring 247, tensions of which are adjusted by regulating the screw-plug 248. When this valve is unseated, chamber 238 is in communication with the main-service-valve chamber and subject to the pressure therein. The air-pressure from the main train or brake pipe enters the slide-valve chamber 233 and forces the supply-valve piston 236 forward, compressing the spring 249, that is interposed at the one end by the cap 250 and at the other end by the button 251 around the stem 252, drawing supply-valve 253 with it, thus uncovering port 254. The fluid thereby gains entrance directly into the main-service-valve chamber through passage 239 and port 240 into the main-service-valve chamber. The increase of pressure in the main-service-valve chamber and in chamber 243 over the flexible diaphragm 245 continues until it becomes high enough to overcome the tension of the regulating or governor spring 247, previously adjusted at seventy pounds. The flexible diaphragm 245 then yields and permits the regulating-valve 244 to be seated by spring 246, closing port 242 and cutting off communication between chamber 238 and the main train or brake pipe pressure. The pressure in chambers 238 and 233 now equalize quickly through leakage through the piston-chamber 255, past the supply-valve piston 236, and the supply-valve-piston spring 249, previously compressed when the supply-valve was forced to the right, now reacts and forces the supply-valve piston 236 and supply-valve 253 to their normal positions, closing port 254 and cutting off communication between the main train or brake pipe pressure and the main-service-valve chamber. The slide-valve 253 is held to its seat by a spring 256 and is shifted on its seat by the shoulders 257 and 258. The slide-valve 253 has two functions: the first by closing-port 254, when the fluid-pressure in the chamber 238 is equal with that in chamber 233, and the second function is by placing the main-service-valve chamber in communication with the brake-piston cylinder through passage 257$^a$, port 258$^a$, in the seat 237 of the slide-valve 253, through cavity 259 in the bottom of the slide-valve 253, and thence communicating with port 260 in the seat of the slide-valve, which leads into passage 261 in the valve-body, which passage 261 communicates with passage 262, leading into the retaining-valve chamber 185. The flexible-diaphragm spindle 263 moves in the center of the taper ring 264, forced against the flexible diaphragm seated by the governor-spring 247, interposed on the one end by the shoulder of the spindle and at the opposite end by the screw-plug 248. The screw-plug 248 has a check-nut 265. The functions of this governor-valve are such that when the fluid under pressure from the main train or brake pipe leading through the valve-chambers into the main-service-valve chamber that when the fluid under pressure in the main train or brake pipe contains an excess pressure above that of the normal—say seventy pounds—the governor-valve is so adapted to cut off such excess pressure from flowing into the main-service-valve chamber and auxiliary reservoir, and the functions of the slide-valve in the device are so adapted to first cut off such pressure from flowing into the main-service-valve chamber, and when this pressure is cut off it opens communication between the main-service-valve chamber and the brake-piston cylinder, through the passages, as above described, thence through the cavity in the bottom of the main service slide-valve into the brake-piston cylinder. Thus it will be seen and understood that any excess pressure leaking past the piston 170 (see Fig. 9) flowing in the main-service-valve chamber 171 will pass to the brake-piston cylinder through the ports and passage herein described, or the same exhaust-passage on the under side of the main service slide-valve 173 (see Fig. 9) will admit fluid under pressure into the brake-piston cylinder and from the brake-piston cylinder to the atmosphere without shifting the same. It will further be understood that as soon as the fluid under pressure in the main train or brake pipe is reduced to normal or seventy pounds, then equalizing with the pressure in the main-service-valve chamber and auxiliary reservoir, the slide-valve 253 will keep port 254 closed until the fluid-pressure in the main-service-valve chamber and auxiliary reservoir becomes less than that of seventy pounds pressure, of which the governor-spring 247 is set.

In Fig. 15 I show a central section through the regulating-valve and spring-box and a transverse section through the supply-valve case, secured to the main-valve casting 171$^a$ of the fluid-pressure brake system on each car or vehicle, showing in elevation also the retaining-valve and the reducing-valve F.

In Fig. 16 I show a view in elevation of the main-valve casting 171$^a$ in the fluid-pressure brake system on each car or vehicle. Formed on the top of the end casting 166 is the modified governor-valve mechanism A, as shown in section in Figs. 14 and 15, and also the retaining-valve governor device B, formed at the top of the main casting, and the head end view of the retaining-valve mechanism in elevation; also, a modified reducing-valve formed at the bottom of the main casting, as in section. (See Fig. 22.) In dotted lines passage 229 leads out of chamber 167 into governor-valve chamber 225, thence through passage 228 into chamber 219.

In Fig. 17 I show a modification of the device shown in Figs. 5, 6, and 7 by removing the section 98 and the brake-piston-cylinder governor-plate 99 and modifying the top casting 100, (shown in Fig. 5;) also, the automatic multiple-governor-valve device V in elevation, secured to the plate 97. In this figure I show the passage 103 leading out of chamber 95, communicating directly with chamber 106, in dotted lines, leading from chamber 106 is a passage 266, which passage leads into passage 267 in the train-line governor-plate 97, thence into passage 141, through a taper-valve device 270, adapted to admit and cut off the flow of pressure flowing into and through the governor-valve device P. This taper valve (shown in elevation) I substitute for the rotary valve 108. (See Fig. 5.) The passage 143 leads into passage 268 in the train-line governor-plate, thence into passage 269, which communicates with passage 116, leading into the chamber 115. The taper valve 270 is so adapted that it will open communication between the chamber 106 and any of the governor-valves P, R, T, and X, as shown in Fig. 6. As the pressure that flows from chamber 106 is in excess of the normal main train or brake pipe pressure, it is conveyed through passages into chamber 115 above the piston 110 before it reaches the passage 119, leading to the main train or brake pipe, for reason that if the excess pressure flows directly into the main train or brake pipe it would shift the piston 110 and open the valve 112 before the pressure above the piston 110 in chamber 115 would be equalized. As chamber 115 and passages 117 and 118 are in communication with the main train or brake pipe and the rotary valve 102 is in its second position, the excess pressure admitted through the governor-valves will flow directly through passage 116, chamber 115, passages 117, and 118 119 into the main train or brake pipe. The valve 112, operated by the piston 110, is so adapted that when the excess pressure is taken from the equalizing-reservoir 90 by the engineer a quantity of air to reduce the pressure in the main train or brake pipe to seventy pounds, this valve 112, operated by piston 110, will take from the main train or brake pipe and release the brakes the same quantity of excess pressure that is in the main train or brake pipe above the normal that the engineer has taken from the equalizing-reservoir 90. It will also be understood that the valve 112 and the piston 110 are opened the same way to make an application of the brakes, as well as to make an application, both by reducing the pressure in the main train or brake pipe, the one reduction from that pressure of seventy pounds to a certain pressure less than seventy pounds in order to shift the main-service-valve device in the fluid-pressure brake system on each car or vehicle, while if an excess pressure existed in the main train or brake pipe to a certain point above seventy pounds, in order to make or perpetuate an application of the brakes, reaching the brake-piston cylinder through the retaining-valve mechanism, the piston 110 would be operated by the engineer taking as many pounds of air-pressure from the equalizing-reservoir 90 as it would require to reduce the pressure in the equalizing-reservoir to that of normal train-pipe pressure—namely, seventy pounds. While the piston 110 is thus operated and opens the valve 112, it will take the same number of pounds of excess pressure from the main train or brake pipe until the pressure in the main train or brake pipe became at the normal—namely, seventy pounds—as this device on a locomotive is so adapted to perpetuate an application of the brakes after the main service-valve has been driven to its seat, and the pressure can be reduced or exhausted entirely from the brake-piston cylinder to atmosphere without further shifting the main service slide-valve on each car or vehicle in the fluid-pressure brake system, the pressure flowing to and from the brake-piston cylinder through the exhaust-cavity on the under side of the main service slide-valve in the brake apparatus on each car or vehicle.

In Fig. 18 I show a view in elevation of the main valve-casting 171$^a$ and a vertical sectional view of the end chamber 166, showing a modified automatic governor-valve mechanism B, the pin-valve being removed and a flexible diaphragm being substituted to seat on the member 271, with a passage 272 leading into passage 227, which passage communicates directly with the chamber 219 of the retaining-valve mechanism. I also show in this figure an end view of the retaining-valve face and chamber 185, also the reducing-valve F in elevation and a modified governor-valve mechanism in elevation as in section. (See Figs. 14 and 15.)

In Fig. 19 I show an elevation view of the auxiliary reservoir and brake-piston cylinder in the fluid-pressure brake system, which is secured to each car or vehicle.

In Fig. 20 I show an end view in elevation and a side view of the retaining-valve device, also a vertical view of reducing-valve F in elevation and a vertical central section of a modified governor-valve A attached to the main valve-casting 171$^a$. The port 188$^a$ extends upward and connects with the passage 189, which passage leads to a valve-chamber 273, in which is located a regulating-valve device 274 for controlling a passage 275, opening into a chamber 276 on the upper side of a governor spring-pressed piston 277. The chamber 276 is connected by means of the passage 278, which is always in communication with the main-service-valve chamber 171. When the valve 274 is open, the air passes from the passage 189, through the passage 275, into the chamber 276 and from the chamber 276, through the passage 278, into the main-service-valve chamber 171 and thence to the auxiliary reservoir. The regulating-valve 274, as shown in the drawings of the modified governor-valve mechanism, has a stem 279 extending upward from it and guided by the cap 280. Surrounding the stem is a spring 281, which abuts at one end against the cap 280 and at the other end against the collar 240 on the valve 274 and tends to seat the valve when the piston 277 does not oppose it. In the casing 282, which is secured to the main valve-casting 171$^a$ on each car or vehicle in the system by means of bolts. A piston-chamber 283, in which the piston 277 is fitted in the bushing 284, the piston 277 is fitted with a packing-ring 285, to prevent air from escaping to atmosphere out of chamber 276, the piston-stem 286 has a shoulder 287 and is surrounded by a tubular casing 288, which at one end is screwed into or secured to the casting 282 and is closed at the other end by the screw-plug 289. The screw-plug 289 serves as a guide for the stem 286 and as the butment for the governor-spring 290, which at its other end bears against the shoulder 287. The screw-plug 289 is covered by a check-nut 291. The spring 290 is regulated under a predetermined point of pressure to hold the piston 277 at the upper end of its movement, in which position the projection 292 abuts against the wing-stem of the valve 274 and holds it away from its seat 293. The tension of the governor-spring 290 is such that when the proper maximum pressure is reached in the main service-valve chamber, which is always in communication with chamber 276, the pressure from the main-service valve-chamber acting on the upper side of the piston 277 is sufficient to compress the governor-spring 290 and move the piston 277 away from the valve 274, thereby permitting the valve 274 to be seated on its seat 293 by its spring and the fluid under pressure above it and to cut off the flow of fluid under pressure from the main train or brake pipe from the main-service-valve chamber. If the pressure in the main-service-valve chamber and auxiliary reservoir becomes reduced below the maximum or seventy pounds, the reduction of pressure in the chamber 276 permits the governor-spring 290 to move the piston 277 back again, which movement will open the valve 274. A slide-valve chamber 294 has direct communication with the chamber 276 and also with the passage 278, leading to the main-service-valve chamber. In this slide-valve chamber is a slide-valve 295, adapted to move on a flat seat 296, similar in all respects to that of the main service slide-valve and held thereto by the spring 297. The slide-valve 295 is shifted on its seat by the shoulders 298 and 299, secured to the piston-stem 300. The piston-stem 300 is also connected by the stem 301 with the movement of the piston 277, so that when the piston 277 is forced by pressure to compress the governor-spring 290 it shifts the slide-valve 295 so that port 302 in the slide-valve communicates with port 303, which opens communication between chamber 276 and the passage 262, leading to the retaining-valve chamber 185. The piston 277 is secured to the stem 286 by means of the threaded nut 304 holding in place between the shoulder 287 and the piston 277 flexible material, such as leather or rubber, 277$^a$ between the bushings 284 and 284$^a$ to prevent leakage to atmosphere through the governor-spring chamber 288. This governor-valve mechanism is a modified governor-valve device A performing the same functions as the governor-valve device A in other parts of the drawings regardless of position—that is, to govern all the fluid under pressure in the main-service-valve chamber and auxiliary reservoir and to communicate the main service-valve chamber with the brake-piston cylinder after such ports and passages are opened, as described.

In Fig. 21 I show a slight modification of the automatic governor-valve mechanism A as shown in Fig. 20—that is, the slide-valve device 295 is centrally located between the valve 274 and the piston 277. Otherwise the functions are the same.

In Fig. 22 I show a modified reducing-valve mechanism formed in the main valve-casting 171$^a$, as in Serial Nos. 147,042 and 198,934, which is a transverse section on line of the valve F of Fig. 16. From passage 181 leads the reducing-valve passage 182 into chamber 305, which chamber has a leakage-valve 306 held normally to its seat 307, closing a leakage-port 308, leading into a spring-chamber 309. In the chamber 305 is a flexible diaphragm 310, which forms a wall or partition between the chamber 305 and the governor-spring chamber 311. When the fluid-pressure flows into the brake-piston cylinder, it also flows into chamber 305 and will be held there until the pressure therein comes to that certain point which will move the flexible diaphragm 310 against the disk-hub 312 and oppose the regulating-spring 313, which is interposed between the shoulder 314 around the stem 315 and at the opposite end against the screw-plug 316. Such movement of the flexible diaphragm will admit of the opening of the valve 306 by the spring 317, which is under pressure interposed at the one end by the shoulder 318 on the valve-stem and at the other end by the valve-casing. This movement of the valve will permit the excess pressure in chamber 305 and brake-piston cylinder to escape to atmosphere through the leakage-port 318, until the governor-spring 313 seats the valve, when the pressure in the valve-chamber and brake-piston cylinder has been reduced, check-nut 319 is secured to the screw-plug. The governor-spring chamber is formed by the tubular casting 320 and is secured to the main valve-casting 171$^a$ so that the shoulders 321 of the tubular casting bear tightly against the inwardly-taper ring 322, which serves to hold the flexible diaphragm 310 tightly in position, preventing any leakage of fluid under pressure around the edges of the flexible diaphragm. An exhaust-port 323 leads out of the spring-chamber 311 for the escape of any pressure that might collect therein. The functions of this device are such that it may form any part of the main casting in the fluid-pressure brake system on each car or vehicle, so long as the exhaust-port 318 is open to the atmosphere, while in this figure it is shown on the under side of the main casting.

In Fig. 23 I show a device in elevation having duplex functions to automatically compress the fluid under pressure after being drawn from the atmosphere and to automatically regulate the devices therein so that when a predetermined point of pressure is reached in the chambers of the device it will stop, the functions therein being in all respects similar to those shown in Figs. 1, 2, and 3. The steam from the locomotive operates a device and exhaust therefrom similar to that of Figs. 1, 2, and 3 in the drawings.

Fig. 24 is a vertical central section of an automatic governor device, on a scale larger than the pipe 89, to govern or regulate the steam under pressure flowing into the equalizing-reservoir 90. Leading from the pipe 89 the fluid or pressure enters the chamber 324 and flows through the valve-port 325 and passage 326, the valve 327 being normally held open or unseated by a spring 328 bearing against one side of a piston 329, which is fitted in a chamber 330 and secured to the end of the valve-stem 331. The chamber 330 and the valve-chamber 332 are separated by means of a partition 333, which is perforated to admit the passage of the stem 331, and in order to prevent leakage of the fluid or steam from the chamber 332 to the piston-chamber 330 a projecting seat 334, on which the valve 327 seats when opened, is formed on a partition 333. The chamber 330 is open to the atmosphere through a passage 335 (shown in dotted lines) on the opposite side of the piston-chamber 330, as in Fig. 27. The steam or air flows through the port or passage 325 is controlled by the valve 327, which is moved down on its seat 336 by the fluid-pressure acting on the top or back of the governor-piston 329, against the pressure of the spring 328 and the upward pressure of the air or steam-pressure below the valve 327. The air or steam pressure that operates the governor-piston 329 in the piston-cylinder 330 enters through the nozzle 337 and passages 338 and 339 into the flexible-diaphragm chamber 340, where it presses against the lower side of the flexible diaphragm 341, which is held in its normal position by the pressure of the governor-spring 342. The outer edge of the flexible diaphragm 341 is clamped between the shoulder 343 and the ring or abutment 344 by means of that portion 345 of the governor-spring chamber 346. The lower side of the inwardly-taper ring or abutment 344 forms a perfect bearing on the flexible diaphragm 341. The disk 347, which fits neatly in the central opening in the taper ring, projects a little below the inner edge of the ring when the disk is in its lower position or when the pin-valve is seated and the lower surface of the disk is flush with the lower surface of the ring or that part that is on a plane with the bearings of the flexible diaphragm, thereby forming one continuous surface without any intervening space between the disk and the ring when the flexible diaphragm and the pin-valve have been raised to its upper position. The disk 347 has a hub or projection 348 formed on it, against which one end of the governor-spring 342 bears, and held in position by the stem 349, and the upper end of the governor-spring 342 bears against the screw-plug 350, which is so adapted that it is adjustable in the governor-spring casing 346 and is held in place by a check-nut 351. The central portion of the flexible diaphragm 341 is clamped between the disk 347 and the thimble-nut 352, which is secured in place by means of a threaded projection 353, (not shown,) which is screwed into a central threaded bore which is formed in the disk-hub. The stem 354 of the pin-valve 355 passes through an opening 356 (not shown) in the thimble-nut 352 and has formed on its upper end a shoulder 357, (not shown,) which abuts against the inner end of the bore 358 (not shown) and forms a bearing for the one end of a spring 359, (not shown,) while the other end of the spring 359 bears against the projection 353 on the thimble-nut 352, so that the spring tends to hold the head 357 of the pin-valve against the inner end of the bore 358. When the fluid-pressure in the flexible-diaphragm chamber 340 is below the amount or the maximum required to compress the governor-spring 342 and lift the flexible diaphragm 341, the pin-valve 355 is held to its seat in the position shown and closes communication through the passages 360 and 361 between the flexible-diaphragm chamber 340 and the piston-chamber 362. When the pin-valve 355 is seated on its seat 363, closing the passage 360 and 361, the flexible diaphragm and disk, which lies in a plane of its outer edge is clamped to its bearing, as shown by the taper-ring 344. The lower flat surface of the disk 347 then coincides with and forms the bearing for the larger portion of the upper flat surface of the flexible diaphragm. When the pressure of the fluid in the flexible diaphragm-chamber 340 rises above the desired amount or maximum, the pressure on the under side of the flexible diaphragm overcomes the tension of the governor-spring 342 and moves the flexible diaphragm 341 and the disk 347 upward, and with them the pin-valve 355, or unseats the valve. The upward movement of the flexible diaphragm and the disk 347 is small and is stopped by the projection 364, formed on the lower end of the governor-spring chamber 346. When the pressure below the flexible diaphragm 341 exceeds the pressure to which the governor-spring 342 is set, it raises the flexible diaphragm and pin-valve 355. Then a portion of the fluid in the flexible-diaphragm chamber 340 flows through the passages 360 and 361 into the piston-chamber 362 and acting on the piston 329 forces it downwardly, compressing the spring 328 and closing the valve 327, which controls the fluid-pressure flowing through port 325. After the screw-plug 350 has been adjusted in the governor-spring chamber to compress the governor-spring 342 to a certain point of pressure this pressure may be increased by fluid flowing through the nozzle 364 and passage 365 into piston-chamber 366 acting on a piston 367, fitted with suitable packing-rings 368, secured to a piston-stem 369, moving through a bore 370 in a partition between the piston-cylinder 371 and the check-nut 351, the piston-stem 369 passes through the bore or guideway 370 and the bore 376 in screw-plug 350, acting on a cap 372, which will compress the regulating governor-spring 342 to action on the pin-valve 355 and hold it seated to any predetermined point of pressure desired. A vent-port 373 communicates the passage 361 with the atmosphere, adapted to admit of the pressure above the piston 329 to atmosphere to allow the valve 327 to be opened, also a vent-port 374 in the governor-spring chamber 346 allowing air to leak from the chamber to the atmosphere. The same applies to port 375 in the piston-cylinder 371. Parts not shown in Fig. 24 are the same as those shown in governor-valve mechanism H, Fig. 1.

In Fig. 25 I show a modification of Fig. 24 omitting the pin-valve 355 and seating the flexible diaphragm directly on its seat 363, also a slight modification in the governor-valve 327, substituting a plane surface for a taper-valve.

In Fig. 26 I show a section, broken away, of the piston-chamber, Fig. 25, with a leakage-pipe secured thereto.

In Fig. 28 I show a modification of the automatic regulating device to compress fluid under pressure in the fluid-pressure brake system. Substituting duplex governors, (lettered H,) the functions are similar to those governors lettered H shown in Figs. 1 and 2.

In Fig. 29 I show a duplex-governor-valve mechanism in elevation. The functions are identical with those shown in section in Fig. 24.

Although I have described certain forms and kinds of devices, I do not desire to limit myself to the same, as they may be varied and changed by a skilled mechanic without departing from the spirit and essence of my invention.

The advantages of my invention will be appreciated by those skilled in the art. Not only can the ordinary service application of the brakes be made where the automatic governor-valve device A is open, but also a quick emergency application may be applied from the auxiliary reservoir by a free flow of pressure through an always-open passage between the inner face of the driving-piston and the auxiliary reservoir. I am also enabled to admit fluid under pressure from the main train or brake pipe into the brake-piston cylinder after the main service-valve has been shifted to a released position, and that the pressure in the brake-piston cylinder will be such that by the gage on the locomotive the engineer may be able to tell the pounds pressure therein by the operation of a duplex governor-retaining valve, the one governor being set to admit fluid-pressure into the retaining-valve chamber and at a certain predetermined point of pressure exists in the main train or brake pipe, while the other governor controls the fluid-pressure in the brake-piston cylinder so that when the fluid-pressure therein reaches a predetermined point of pressure the latter governor will cut off communication between the former and the brake-piston cylinder.

It is a further object of my invention to provide for suitable gasket-packing anywhere between surfaces of pressure-plates or pressure-plates and their bearings for the purpose of making air-tight partitions to prevent any loss of air to the atmosphere.

It is a further object of my invention to provide a slide-valve feed-valve formed in the flexible-diaphragm chamber, as shown in Fig. 15, similar to the slide-valve feed-valve shown in Fig. 21, for the purpose of having said slide-valve operated in a chamber which is in communication with the same fluid-pressure that is in the main-service-valve chamber and auxiliary reservoir and adapted to be moved by the stem of the valve 244. (Shown in Fig. 15.)

It is the further object of my invention to provide for the position of the sensitive portions thereof of the governor-valve mechanism A, containing a flexible diaphragm, so that that portion of the casting may be formed in any position irrespective of location, so that the ports described in Figs. 14 and 15 may communicate with the slide-valve chamber and piston-chamber of the governor mechanism.

It is the further object of my invention to provide for the location of the governor device A so long as the chambers therein communicate with the air-brake apparatus on each car or vehicle.

It is the further object of my invention to provide for a seat formed on the inner end of the bushing containing the main-service-valve driving-piston to act as a stop for the inward travel of the same.

I have used in the specifications and claims the term "automatic governor-valve." By this term I include any device which will act as a governor either to retain, admit, or control fluid-pressure in the passages; for it will be clear to the skilled mechanic that other equivalent devices may be used in place of the flexible diaphragms, springs, and valves hereinbefore described—as, for instance, the same result may be obtained by the use of pressure-acting piston-valves in place of the flexible-diaphragm valves, the two being well-known equivalents, both governing the flow of fluid-pressures by differences of pressure on opposite sides of the piston or flexible diaphragm. I also do not desire to limit myself to the specific construction and arrangement of parts which I have employed, my purpose being to describe fully and clearly an automatic operative mechanism, which, however, may be modified in many ways by the skilled mechanic. I also provide for a pin-valve to be operated in connection with the main service slide-valve, as shown and described in my application filed March 9, 1903, Serial No. 147,042.

What I claim, and desire to secure by Letters Patent of the United States, is—

1. In an automatic fluid-pressure brake system, the combination of an automatic regulating device to compress fluid under pressure, a main supply-pipe, a main reservoir, a controlling or an application device, with supplemental governers attached thereto, an indicating-gage, an equalizing-reservoir, a main train or brake pipe, a main service-valve, an auxiliary reservoir, and a brake-piston cylinder, having duplex automatic governor-retaining-valve feed-valve means on each car or vehicle, operated by excess fluid-pressure, controlled by the engineer, so adapted to open and close a passage leading from the main train or brake pipe to the brake-piston cylinder, and to close the passage leading from the brake-piston cylinder to the atmosphere, the device is so adapted to charge the brake-piston cylinder when excess fluid under pressure is in the main train or brake pipe, after the main service-valve has been shifted to a released position by the said excess pressure in the main train or brake pipe above the normal, so there will be a certain amount of fluid under pressure, in the brake-piston cylinder, to perpetuate an application of the brakes, after the main-service-valve chamber and auxiliary reservoir have been cut off from the main train or brake pipe, also other automatic governor means controlled by said devices to keep the exhaust-passage closed, leading from the brake-piston cylinder, to the atmosphere, when the fluid-pressure in the main train or brake pipe is greater than that in the main-service-valve chamber, and auxiliary reservoir, until the fluid-pressure in the main train or brake pipe has been reduced to normal therein, substantially as set forth.

2. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and brake-piston cylinder, having duplex automatic governor-retaining-valve feed-valve devices on each car or vehicle, that will automatically open and admit a certain portion of fluid under pressure when an excess fluid-pressure exists in the main train or brake pipe, the said pressure will flow into the brake-piston cylinder, when a certain amount of excess fluid-pressure from the main train or brake pipe, operates the duplex automatic governor-retaining-valve feed-valve devices, closing the exhaust-passage to retain the fluid under pressure that the engineer wishes in the said brake-piston cylinder, a governor-valve adapted to cut off communication between the main train or brake pipe and the brake-piston cylinder simultaneously keeping the exhaust-passage closed to perpetuate an application of the brakes, after the main service-valve has been shifted to a released position and the main-service-valve chamber and auxiliary reservoir is cut off from the main train or brake pipe, and the pressure therein is less than that in the main train or brake pipe and greater than that in the brake-piston cylinder, substantially as set forth.

3. In an automatic fluid-pressure brake system, the combination of an automatic regulating device, to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having governor means on each car or vehicle, so adapted that three or more different fluid-pressures may be had at the same time on said car or vehicle, after the main service-valve has been shifted to a released position. By an excess fluid-pressure in the main train or brake pipe, said excess pressure operates means to govern the fluid under pressure in the main-service-valve chamber, and also operates a duplex automatic governor, retaining-valve feed-valve device, to retain fluid in, and feed the brake-piston cylinder with fluid-pressure, when a perpetuation of the brakes is desired, substantially as set forth.

4. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means so adapted on each car or vehicle, to reciprocate between pressures opening and closing a passage leading from the main train or brake pipe, to the brake-piston cylinder. The pressure on the one side of said means is a governor-spring and fluid under pressure from the brake-piston cylinder, while the fluid-pressure on the other or inlet side is that from the main train or brake pipe, after the main service-valve has been shifted to a released position, opening a passage leading from the retaining-valve chamber to the brake-piston cylinder, substantially as set forth.

5. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having duplex automatic governor-retaining-valve feed-valve devices to perpetuate an application of the brakes, said device being so adapted to release the brakes through the exhaust-cavity on the under side of the main service-valve, without shifting the same, after a perpetuation of the brakes has been had and the excess fluid under pressure in the main train or brake pipe is reduced to normal, the application being perpetuated after the main service-valve is cut off from the main train or brake pipe, and simultaneously feeding the brake-piston cylinder from the main service-valve chamber and auxiliary reservoir, substantially as set forth.

6. In an automatic fluid-pressure brake system, the combination of an automatic regulating device, to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having means in an automatic governor device to cut off the main train or brake pipe from the main-service-valve chamber and to admit fluid under pressure from the main-service-valve chamber and auxiliary reservoir, into the brake-piston cylinder, after the main service-valve has been shifted to a released position, and when the excess fluid under pressure in the main train or brake pipe has operated the duplex automatic governor-retaining-valve feed-valve device, to perpetuate an application of the brakes, substantially as set forth.

7. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means on a locomotive so adapted to change the pressure in the main train or brake pipe, so an application of the brakes may be had or perpetuated, and the same released without shifting the main service slide-valve on each car or vehicle, in the fluid-pressure brake system, governor means on each car or vehicle to control the pressure in the main-service-valve chamber, while there is an excess pressure in the main train or brake pipe, substantially as set forth.

8. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having an automatic governor fluid compressing and regulating device to compress fluid under pressure from the atmosphere and discharge the same into the system to any predetermined point of pressure desired, having a supply-pipe from the locomotive for the flow of steam independent of any governor or regulating means in the same, to control the steam before it enters the passage cored in the castings of the device, but after the steam flows through the pipe from the locomotive into the cored passages in the casting of the device, it then flows through the automatic governor-valve chambers, thence into parts to operate a steam-piston after it flows through said governor-valve device, located and formed in the main casting of the device that compresses fluid under pressure so that fluid-pressure drawn from the atmosphere by the air-piston will be charged to any predetermined point of pressure in the receiving-chamber formed or cored in the main casting, such pressure being regulated independent of any other reservoirs or pipes connected therewith, that is, the device to compress fluid under pressure will automatically regulate the air fluid under pressure in the receiving-chamber formed in the casting, if it is disconnected from any other outlet, said air-fluid pressure after being drawn from the atmosphere will be compressed under any predetermined pressure desired, before it flows into any other reservoirs or pipes in the air-brake system, the device is so adapted to have an always open and unobstructed steam-passage between the boiler of the locomotive and the device, the air-piston is operated by the steam-piston, a cored passage leading from the fluid-pressure chamber of the device into the flexible-diaphragm chamber of the automatic governor device for the purpose of having open communication at all times between the fluid-pressure chamber and the automatic governor flexible-diaphragm chamber, so that as the pressure increases in the fluid-pressure chamber it likewise increases in the flexible-diaphragm chamber, the governor-spring in the governor device is set to a predetermined point of pressure, when the pressure in the flexible-diaphragm chamber reaches that certain predetermined point it forces the flexible diaphragm against the governor-spring, opening the pin-valve from its seat and admitting air fluid under pressure into a piston-chamber which piston therein being connected to a valve which when acted upon will cut off the steam from flowing into the steam-piston cylinder of the device, thus regulating the pressure in the fluid-pressure chamber before the pressure is admitted to flow into any other chambers, pipes, or reservoirs, substantially as set forth.

9. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having duplex means on a locomotive so adapted that they may be manipulated to increase the fluid under pressure in the main train or brake pipe without shifting the screw-plug in the governor-spring chamber, the governor-spring chamber being separated from the main train or brake pipe by means of a non-porous or solid pressure-plate, the tension of the governor-spring may be increased to any point of pressure desired by simply rotating the handle engaged with the periphery of the ring to simply compress the governor-spring to any point of pressure desired leaving the screw-plug set at the normal fluid under pressure in the main train or brake pipe, while the fluid under pressure is flowing through the ports of the rotary valve and entering such governor device, thence into the main train or brake pipe, the method of this operation is for the purpose of having means within the reach of the engineer so that while the normal fluid under pressure is flowing through said means into the main train or brake pipe, that the means may be manipulated in a way that will increase the fluid under pressure in the main train or brake pipe for the purpose of operating a duplex automatic governor-retaining-valve feed-valve device on each car or vehicle, and to cut off the fluid under pressure from flowing from the main train or brake pipe into the main-service-valve chamber and auxiliary reservoir in order that a perpetuation of the brakes may be had without increasing the fluid-pressure in the main-service-valve chamber and the auxiliary reservoir, and also adapted to cut off the fluid under pressure from flowing from the main reservoirs into the main train or brake pipe at any time at the wishes of the engineer, also means to release this excess pressure from the main train or brake pipe to the atmosphere without shifting the main service-valve on each car or vehicle, substantially as set forth.

10. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having a device on the locomotive, to indicate the pressure both in the main train or brake pipe, the main reservoirs, and the brake-piston cylinder, and a device to make an application of the brakes and to control the air under pressure, in the main train or brake pipe, so that it will operate devices so adapted to control the fluid under pressure in the main-service-valve chamber, and auxiliary reservoir on each car or vehicle, and also to admit the flow of fluid-pressure from the auxiliary reservoir through said device, and the exhaust-passage into the brake-piston cylinder, after the main service-valve has been shifted to a released position, to perpetuate an application of the brakes, the retaining-valve mechanism being operated by excess pressure to open passages for the same to flow into the brake-piston cylinder, substantially as set forth.

11. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means in an automatic regulating and compressing device to compress fluid under pressure, the regulating or governor means being fitted in a chamber that forms a part of the main casting and located in the steam-passages cored in the castings of the mechanism, to govern and regulate the movement of the steam-piston therein, so that any predetermined point of pressure may be had in the chambers in communication with the air-piston moving in the air-piston chamber, and operated by the steam-piston connected thereto, an air-fluid passage being cored through the main casting leading from the air-pressure chamber into the flexible-diaphragm chamber of the governor device for the flow of air under pressure into said flexible-diaphragm chamber, to raise the valve therein by the movement of the diaphragm, which unseated valve will admit air to act on a piston, said piston forces a valve down on its seat, which cuts off the steam from flowing from the passage in the mechanism into and through the governor-valve chamber, thence into the main steam-piston cylinder and remains closed until the air in the fluid-pressure chamber and main reservoir becomes reduced, when the valve will open as before, admitting steam into the steam-piston cylinder, the passage connecting the fluid-pressure chamber of the device with that of the flexible-diaphragm chamber of the automatic governor device is independent and not connected with any other source of supply, substantially as set forth.

12. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, and a main train or brake pipe, a main service-valve, an auxiliary reservoir, and a brake-piston cylinder, having an automatic mechanism to compress air fluid under pressure from the atmosphere and the same to be governed by an automatic governor device before the fluid-pressure is admitted from the fluid-pressure chambers in the mechanism into any pipes or other reservoirs, the automatic regulating device is formed in the castings of the mechanism to cut off the flow of steam after it enters the passages in the mechanism and before it flows into the differential piston and slide-valve chamber, thence into the main piston-cylinder, an always-open passage through a pipe between the boiler of the locomotive and the nozzle of the mechanism to which it is attached for the flow of steam into the passages and operative means in the mechanism for the purpose of compressing air from the atmosphere to any predetermined point of pressure desired, and to be regulated to any predetermined point of pressure desired before the air-fluid pressure is admitted from the fluid-pressure chambers in the mechanism to its source of flow, said governor-valve being in a supply steam-passage formed in the casting of the device that compresses fluid under pressure, regulating the steam to any predetermined point of pressure desired, to operate the steam-piston therein, said governor-valve chamber which is formed in the main casting of the device that compresses air fluid under pressure being always in communication on the one side of its opening-port with the supply-passage in the main fluid-pressure device and at the outlet-passage the differential-piston and slide-valve chamber, all adapted to cut off the flow of steam as the steam flows through the passages cored and formed in one of the main castings of the device that compresses air fluid under pressure to supply the air-brake system, a passage leading from the air-piston-supply pressure-chamber formed in the main castings, and through the castings into the flexible-diaphragm chamber of the governor device, to operate a steam-governor valve when the fluid-pressure in the air-chambers and passages in the castings of the mechanism reaches a predetermined point of pressure, when such pressure is reached and exists in the fluid-pressure chamber and the passage leading from said chamber to the flexible-diaphragm chamber of the governor device, to a predetermined point of pressure, said flexible diaphragm will yield and compress a governor-spring the same unseating a valve, which opens the passage between the fluid-pressure chamber and the piston-chamber, containing a piston with a steam-valve attached thereto, adapted to be forced to its seat by said pressure acting upon the upper surface of said piston, thus cutting off the flow of live steam in the passages cored and formed in the main casting of a mechanism that is adapted by the pressure of steam to compress air fluid under pressure to any predetermined point desired, substantially as set forth.

13. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having an automatic duplex mechanism to compress air fluid under pressure from the atmosphere and discharging the same into a fluid-pressure chamber, an automatic duplex governor or regulating device formed in the main castings of the mechanism with an always-open passage between the nozzle of the mechanism and the boiler of the locomotive for the flow of live steam through said passage thence into the passage formed in the casting of the mechanism thence through a duplex automatic governor device formed in the main casting of which forms a part of the main mechanism containing parts of the operative means that are used to compress fluid under pressure from the atmosphere, a passage in said mechanism always open between said governor steam-valve chamber in the casting, and the differential slide-valve piston-chamber, said duplex governor-valve being always in communication through a passage cored in the castings of the mechanism with a fluid-pressure chamber, which chamber is used as the receiving-chamber for which the fluid under pressure from the atmosphere is forced into and governed therein before it flows into any other pipes or reservoirs in the air-brake system, the passage leading from the fluid-pressure chamber through the castings of the mechanism into the flexible-diaphragm chamber, such pressure being equal at all times in the fluid-pressure chamber, in said passage and said flexible-diaphragm chamber, so that when fluid in said pressure-chamber reaches a predetermined point of pressure, said pressure will act on the flexible diaphragm in the flexible-diaphragm chamber of the governor device compressing a governor-spring unseating a valve for the flow of air-fluid pressure to act on a piston having a steam-valve connected thereto for the purpose of cutting off the live steam flowing through a passage cored in the mechanism from flowing into the differential-piston and slide-valve chambers, adapted to stop the movement of the steam-pistons in the mechanism when the fluid air-pressure becomes to that predetermined point of pressure desired, said mechanism is so adapted in its automatic construction that it will regulate itself if the outlet-nozzle from the fluid-pressure chamber is closed, that is when the certain pressure exists in said chamber, the pressure will operate the governor device and cut off the flow of steam from operating the steam-piston, which piston is connected with the air-piston, all independent of any other regulating means than those formed in the castings of the mechanism, substantially as set forth.

14. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means to admit live steam direct from the boiler of the locomotive into an equalizing-reservoir, through the controlling or application device, into the main train or brake pipe, thence through the retaining-valve devices and chambers, into the brake-piston cylinder, to perpetuate an application of the brakes, automatic means on the locomotive and each car or vehicle, to control, govern or regulate, any flow of fluid under pressure, without shifting the screw-plug in the governor-spring chambers, an indicating-gage to indicate the fluid under pressure in the main train or brake pipe and brake-piston cylinder after the main service slide-valve has been shifted to a released position, and opening communication between the auxiliary reservoir and the brake-piston cylinder, substantially as set forth.

15. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having an automatic governor controlling or application device, so adapted to first admit the flow of pressure from an equalizing-reservoir to atmosphere, said manipulation reduces the pressure above a gravity-piston, as the pressure is reduced above the gravity-piston the fluid-pressure in the main train or brake pipe forces the piston to an uppermost position, thereby allowing fluid-pressure in the main train or brake pipe to escape to atmosphere to make an application of the brakes by a reduction of fluid-pressure in the system, other means to regulate or govern at any time all the fluid under pressure in the main train or brake pipe and the brake-piston cylinder, before or after the main-service-valve chamber and auxiliary reservoir is cut off from the main train or brake pipe by the automatic governor and feed-valve device, and also when the duplex automatic governor-retaining-valve feed-valve is being operated to feed, retain, and govern the fluid under pressure in the brake-piston cylinder said governor means being so manipulated by the engineer so that the governor-spring may be compressed to any point of pressure desired, to increase the fluid under pressure in the main train or brake pipe and the brake-piston cylinder, or it may be reduced or changed at will so that the indicating-gage will indicate at any time any point of pressure desired above the normal, such being done without moving the screw-plug in the governor-spring chamber, the governor-spring being interposed between the spring-cap at the one end and bearing at the other end against the disk hub, the latter forcing a solid or a non-porous pressure-plate against its seat in the valve-chamber, the pressure-plate forms an air-tight partition between the valve-chamber and the governor-spring chamber, said spring-chamber being vented to atmosphere, and no communication with the main train or brake pipe, the method of operating or manipulating the automatic governor pressure-spring in such a manner is for the purpose of increasing the fluid under pressure in the main train or brake pipe above that pressure already flowing through the rotary valve-ports, for the purpose of operating the duplex automatic governor-retaining-valve feed-valve device, to feed, retain, and govern the fluid under pressure in the brake-piston cylinder on each car or vehicle, after the main service-valve and auxiliary reservoir has been cut off from such excess pressure in the main train or brake pipe, substantially as set forth.

16. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having a device to admit steam into the main train or brake pipe directly from the boiler of the locomotive after the main service-valve on each car or vehicle, has been shifted to a released position to open communication between the main train or brake pipe through the retaining-valve mechanism into the brake-piston cylinder, to perpetuate an application of the brakes, automatic means to govern the flow of fluid-pressure to any point of predetermined pressure desired, also means to regulate the fluid under pressure in the main-service-valve chamber, so that it does not become higher than that of the normal at a time when the retaining-valve mechanism and the main service slide-valve open communication between the main train or brake pipe and the brake-piston cylinder, also means to indicate the pressure in the brake-piston cylinder, substantially as set forth.

17. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, and an auxiliary reservoir, and a brake-piston cylinder, having a multiple automatic governor device, with no communication between the governor-spring chambers and the main train or brake pipe and instead thereof a non-porous or solid pressure-plate, with means so adapted that the governor-spring may be compressed against the pressure-plate to any predetermined point of pressure desired, without moving or shifting the screw-plug in the governor-spring chamber from a normal or fixed pressure said means are to increase the fluid under pressure in the main train or brake pipe and brake-piston cylinder, to any predetermined point of pressure desired, said pressure being admitted into the main train or brake pipe by a supplemental device, operating a rotary valve to admit through the governor-valve any excess fluid-pressure above a certain fixed pressure, had in the last position of that admitted by the rotary or taper valve into one of the said governor-valves as P, R, T, X, so that as the rotary valve is rotated or moved from one position to another so that each succeeding position of the rotary valves admit a higher pressure of fluid into the system, from the chambers and reservoirs charged with fluid under pressure, said pressure to be that above the normal in the main train or brake pipe, after the excess or amount of fluid-pressure above the normal has been cut off from the main-service-valve chamber and auxiliary reservoir, so that a duplex automatic governor-retaining-valve feed-valve device is being operated to feed retain and govern the fluid under pressure in the brake-piston cylinder and not increase the fluid-pressure in the main-service-valve chamber and auxiliary reservoir above the normal, substantially as set forth.

18. In an automatic fluid-pressure brake system, the combination of an automatic regulating device, to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having automatic valve means in the controlling or application device so adapted that when opened it will reduce the pressure in the main train or brake pipe, thereby making an application of the brakes, and also by a similar manipulation of the device it will release the brakes by reducing the excess pressure in the main train or brake pipe to normal, its functions are such that the same number of pounds of either excess or normal pressure the engineer takes from the equalizing-reservoir, that this application device will take from the main train or brake pipe, means also adapted to change the fluid-pressure in the main train or brake pipe, at the will of the engineer, without shifting a screw-plug in the automatic governor-spring chamber simultaneously while the normal fluid-pressure is flowing through the said application device and controlling-governor or regulating means into the main train or brake pipe, an automatic governor feed-valve being one with automatic means to control the fluid under pressure in the main train or brake pipe above the normal, and in the brake-piston cylinder below the normal, said governor device being operated, when the application parts thereof is open, by simply rotating the handle that engages in the periphery of the ring forcing only the governor-spring to oppose a solid and non-porous pressure-plate, with a higher tension of pressure the method of operation of this application and automatic governor device is such, that the engineer may open the application parts of the mechanism admitting normal fluid under pressure, into the main train or brake pipe, leaving such parts open and then manipulating the governor-valve-device handle to increase said pressure in the main train or brake pipe to any predetermined point of pressure desired, which will be indicated by the indicating-gage, the same being in communication with the main train or brake pipe, the first means referred to is what is called the running position of an application mechanism, the second manipulation referred to is what is termed as an excess-pressure position, for the purpose of operating a duplex automatic retaining-valve feed-valve device to feed, retain and govern the fluid-pressure in the brake-piston cylinder at a time when a perpetuation of the brake is desired, such excess pressure also operates an automatic governor feed-valve device, governs all that fluid-pressure in the main-service-valve chamber and auxiliary reservoir, and opens communication between the main-service-valve chamber, auxiliary reservoir, and the brake-piston cylinder, substantially as set forth.

19. In an automatic fluid-pressure brake system, the combination of an automatic regulating device, to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means in a controlling or application device so adapted that when one of said means is rotated, it will allow air under pressure to pass from the equalizing-reservoir to the atmosphere, thereby causing an application of the brakes, while the other means when rotated, will open communication between the main train or brake pipe through the different automatic governor devices, as P, R, T, X, into the main train or brake pipe opening the retaining-valve mechanism by said pressure, thence being admitted into the brake-piston cylinder, to a certain predetermined point of pressure governed by the retaining-valve governor, a retaining-valve piston adapted to be reciprocated between pressures so that it will cut off the flow of fluid under pressure from the main train or brake pipe into the brake-piston cylinder and not shift the retaining slide-valve to an exhaust position, substantially as set forth.

20. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having an automatic governor device with duplex means to set the regulating or governor spring at any predetermined point of pressure desired, simultaneously when the fluid is flowing through the main train or brake pipe into the air-brake apparatus on each car or vehicle, also automatic means to govern the fluid under pressure in the air-brake system on each car or vehicle and the locomotive, substantially as set forth.

21. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having a controlling or regulating valve device to admit, control, or discharge or increase the fluid under pressure in the main train or brake pipe, to make an application of the brakes by such increase of fluid under pressure in the main train or brake pipe through an automatic air-brake system operating a duplex automatic governor retaining-valve feed-valve device, adapted to feed, retain and govern the fluid under pressure in the brake-piston cylinder, such application being made and released without shifting the main-service-valve device, the means to increase the fluid-pressure in the main train or brake pipe to an excess pressure is such that may be manipulated by the engineer without moving the screw-plug in the governor-spring chamber, the device simply compresses the governor-spring, forcing the pressure-plate against its seat under a higher tension of pressure, an equalizing-reservoir being in communication with such device, an indicating-gage to indicate the pressure in such equalizing-reservoir when there is an excess of fluid-pressure in the main train or brake pipe greater than that in the main-service-valve chamber and auxiliary reservoir, so that an application and a continuous application of the brakes may be had direct from the main train or brake pipe without shifting the main-service-valve device, the pressure in the brake-piston cylinder being less than that in the main train or brake pipe and the main-service-valve chamber and auxiliary reservoir, the fluid-pressure in the brake-piston cylinder being governed to any predetermined point of pressure desired, a pressure-plate adapted to be shifted in the duplex retaining-valve feed-valve mechanism so that it cuts off the flow of fluid-pressure from the main train or brake pipe into the brake-piston cylinder, and simultaneously holding the exhaust-passage closed, leading from the brake-piston cylinder to the atmosphere, means so adapted in the duplex retaining-valve feed-valve device, to keep the exhaust-passage closed leading from the brake-piston cylinder to the atmosphere, until the excess fluid-pressure is reduced in an automatic governor-valve chamber, which chamber and valve therein is so adapted to control or admit a certain amount of excess pressure into a chamber carrying a moving pressure-plate, said pressure-plate operating a device to close the exhaust-passage and to keep it closed until the aforesaid governor-valve is closed when a reduction of the excess pressure takes place in the main train or brake pipe, substantially as set forth.

22. In an automatic fluid-pressure brake system, the combination of an automatic regulating device to compress fluid under pressure, a main supply-pipe, a main reservoir a controlling or an application device, with supplemental governors attached thereto, an indicating-gage, an equalizing-reservoir, a main train or brake pipe, a main service-valve, an auxiliary reservoir, and a brake-piston cylinder, having means so adapted that when the main service slide-valve is being held to its seat, by fluid under pressure of seventy pounds or normal, fluid-pressure that leaks past the driving-piston of the main-service-valve device will flow through open passages, opened by the governor valve device that governs the fluid under pressure in the main-service-valve chamber, said open passage then will communicate with the retaining-valve chamber and thence with the cavity on the under side of the main service slide-valve to the brake-piston cylinder, while the brakes are being perpetuated, and without loss of fluid under pressure in the system, substantially as set forth.

23. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means in an automatic governor device located in the steam-passages, that are cored in the main casting, formed in the chest or casing of a mechanism that is adapted to compress air-fluid under pressure, said device forms a part of the casting of said mechanism of a casting that has open passages leading into a differential piston and slide-valve chamber, also the flexible-diaphragm chamber communicates through a cored passage in the main castings with a fluid-pressure chamber that communicates with the main-air-piston cylinder of the mechanism, and so adapted that the governor-spring in said governor valve mechanism may be compressed to any point of pressure desired by admitting fluid under pressure to act on the piston in the piston-chamber above the governor-spring, such fluid-pressure may be admitted from any source of supply, the method of which is so that the air fluid-pressure in the mechanism may be to that point of pressure of steam in the boiler of the locomotive, substantially as set forth.

24. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means operative to govern the fluid-pressure in the main-service-valve chamber, and auxiliary reservoir to any predetermined point of pressure desired and simultaneously admitting fluid under pressure into the brake-piston cylinder after the retaining-valve is closed and admitting fluid from the main train or brake pipe, into the brake-piston cylinder, substantially as set forth.

25. In an automatic fluid-pressure brake system, the combination of an automatic regulating device to compress fluid under pressure, a main supply-pipe, a main reservoir, a controlling or application device, with supplemental governors attached thereto, an indicating-gage, an equalizing-reservoir, a main train or brake pipe, a main service-valve, an auxiliary reservoir, and a brake-piston cylinder, having means to cut off the flow of fluid from flowing into the main-service-valve chamber and auxiliary reservoir when there is an excess of fluid-pressure in the main train or brake pipe, and simultaneously admitting fluid from the main-service-valve chamber into the brake-piston cylinder after the retaining-valve is closed and admitting fluid from the main train or brake pipe into the brake-piston cylinder, perpetuating an application of the brakes, substantially as set forth.

26. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having duplex automatic governor retaining-valve feed-valve device to feed, retain and govern the fluid under pressure in the brake-piston cylinder to any predetermined point of pressure desired, perpetuating an application of the brakes without loss of fluid under pressure from the device or brake-piston cylinder, through the functions of said device, means being so adapted to feed retain and hold the pressure in the brake-piston cylinder until a reduction of the excess pressure in the main train or brake pipe takes place, the method of which is to reduce the pressure therein by an application device, changing the tension of pressure at the will of the engineer by the supplemental governor in conjunction with the application device, secured to suitable parts of the locomotive so that the engineer can operate the same at will, an automatic reducing-valve in communication with a passage that leads from the main-service-valve chamber to the brake-piston cylinder for the purpose of reducing the pressure in such passages and brake-piston cylinder when the pressure therein reaches a predetermined point of pressure, also means to communicate the main-service-valve chamber and auxiliary reservoir with the brake-piston cylinder when an excess pressure exists in the main train or brake pipe and the main service-valve has been shifted to a released position, substantially as set forth.

27. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having automatic means to cut off the fluid under pressure from flowing through a port and passage into the main service-valve chamber and auxiliary reservoir, on each car or vehicle in the air-brake system, said means adapted to govern and regulate the fluid under pressure in the main-service-valve chamber and auxiliary reservoir, a main service slide-valve having two functions; first, to admit the flow of exhaust-pressure flowing from the brake-piston cylinder to the atmosphere; second, to admit the flow of fluid under pressure from the main train or brake pipe through the duplex automatic governor-retaining-valve feed-valve device, thence through the cavity on the under side of the main service slide-valve into passages leading to the brake-piston cylinder, after the main service-valve has been shifted to a released position, all done without a loss of pressure in said devices while an excess pressure exists in the main train or brake pipe above the normal, substantially as set forth.

28. In an automatic fluid-pressure brake system, the combination of an automatic fluid-pressure device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having automatic means on each car or vehicle to cut off fluid under pressure that is flowing from parts containing a higher pressure into parts adapted to contain a lower pressure than that from the source of supply, governing the fluid under pressure in the main-service-valve chamber and auxiliary reservoir, a regulated amount of excess fluid-pressure in the main train or brake pipe being admitted from the said main train or brake pipe into the duplex automatic governor-retaining-valve feed-valve device to feed, retain and govern the fluid-pressure flowing from the excess pressure of supply into the brake-piston cylinder, automatic means to hold fluid under pressure in the brake-piston cylinder, and simultaneously feed fluid-pressure thereinto from the excess pressure in the main train or brake pipe, said pressure being that above the pressure in the main-service-valve chamber, auxiliary reservoir and brake-piston cylinder, also means adapted to feed the brake-piston cylinder from the main-service-valve chamber and auxiliary reservoir, simultaneously with that from the main train or brake pipe when there is an excess of fluid-pressure in the main train or brake pipe, and the main-service-valve device has been shifted to a released position and fluid under pressure has been cut off from said main-service-valve chamber and auxiliary reservoir, means within reach of the engineer adapted to change the pressure from normal pressure in the main train or brake pipe to any desired excess pressure for the purpose of operating said devices, said manipulation being done without changing the position of the screw-plug in the governor-spring chamber of the automatic governor device, being a supplement to the controlling and application device of the air-brake system, substantially as set forth.

29. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, means to admit fluid under pressure into the brake-piston cylinder from the main service-valve chamber and auxiliary reservoir when there is an excess of fluid-pressure in the main train or brake pipe, substantially as set forth.

30. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means in a duplex automatic governor retaining-valve feed-valve device, that will feed, retain and govern the fluid-pressure in the brake-piston cylinder so adapted to close the exhaust-passage leading from the brake-piston cylinder to atmosphere, only by excess pressure in the main train or brake pipe, and simultaneously opening a passage leading from the main train or brake pipe to the brake-piston cylinder, so that the fluid under pressure in the brake-piston cylinder may be increased or decreased according to the will of the engineer, said changes of pressure in the main train or brake pipe is being done by the engineer in manipulating a multiple governor controlling and application device by increasing the tension of the governor-spring against a solid and non-porous pressure-plate between the governor-spring chamber and the governor-valve chamber of said device, while there is a perpetuation of the brakes being had, said means adapted to open said exhaust-passage only by reduction of excess fluid-pressure in the main train or brake pipe, the fluid under pressure in the main-service-valve chamber and auxiliary reservoir being cut off from the main train or brake pipe and less than that pressure in said main train or brake pipe, substantially as set forth.

31. In an automatic fluid-pressure brake system, the combination of an automatic regulating device to compress fluid under pressure, a main supply-pipe, a main reservoir, a controlling or an application device with supplemental governors attached thereto, an indicating-gage, an equalizing-reservoir, a main train or brake pipe, a main service-valve, an auxiliary reservoir, and a brake-piston cylinder, having automatic governor means adapted in a governing mechanism so that when a pressure-plate is moved from its seat by fluid under pressure, such movement admits the flow of pressure into a chamber to operate a device so that the device closes communication between the main train or brake pipe and the main-service-valve chamber and auxiliary reservoir and simultaneously governing the fluid under pressure in said chamber and reservoir and opening communications between said chamber and reservoir and the brake-piston cylinder, when an excess fluid-pressure in the main train or brake pipe operates a duplex automatic retaining-valve feed-valve device, adapted to retain, feed and govern fluid under pressure in the brake-piston cylinder without any loss of pressure in said device and cylinders, the normal exhaust-passage is being closed, a governor-piston adapted to reciprocate between excess fluid-pressure from the main train or brake pipe on the one side, and the fluid under pressure in the brake-piston cylinder in conjunction with the pressure of the governor-spring on the other side, set to a predetermined point of pressure desired in the brake-piston cylinder, said device so adapted to have open exhaust-passage at the time of normal or service application of the brakes, and not to be obstructed in any way so long as normal fluid-pressure exists in the main train or brake pipe for either a service or an emergency application by a reduction of fluid-pressure therein, substantially as set forth.

32. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having a duplex automatic governor means adapted in a retaining-valve feed-valve mechanism so that when a pressure-plate is moved from its seat, to admit fluid-pressure into the brake-piston cylinder, and govern or regulate the same therein to any predetermined point of pressure desired, such movement admits the flow of excess fluid-pressure through an automatic governor device into a chamber adapted to operate a second governor pressure-plate, and a device so that said device closes the exhaust-passage leading from the brake-piston cylinder to the atmosphere, simultaneously admitting fluid under pressure directly from the main train or brake pipe to the brake-piston cylinder, keeping the brakes supplied by the pressure being perpetuated in the brake-piston cylinder to any predetermined point desired, after the main service-valve chamber and auxiliary reservoir have been cut off from the main train or brake pipe, and the fluid-pressure therein is less than that in the main train or brake pipe, and greater than that pressure in the brake-piston cylinder, means also adapted to communicate the auxiliary reservoir with the brake-piston cylinder after the main service-valve has been shifted to a released position and an excess fluid-pressure exists in the main train or brake pipe, substantially as set forth.

33. In an automatic fluid-pressure brake system, the combination of an automatic regulating device to compress fluid under pressure, a main supply-pipe, a main reservoir, a controlling or an application device, with supplemental governor attached thereto, an indicating-gage, an equalizing-reservoir, a main train or brake pipe, a main service-valve, an auxiliary reservoir, and a brake-piston cylinder, having automatic leakage means in a passage leading from the main service-valve chamber to the brake-piston cylinder, a passage leading from said automatic leakage means to an exhaust-valve chamber a duplex automatic governor-retaining-valve feed-valve device, having vent-ports to relieve the fluid-pressure between one automatic governor-valve device and the fluid-pressure plate adapted to allow the pressure to leak to atmosphere as the exhaust-passage is being opened after a perpetuation of the brakes has been had, leakage means so adapted to reduce the fluid-pressure in the brake-piston cylinder, to prevent the skidding of the car-wheel, when such pressure reaches a certain predetermined point, a governor device adapted to be set under any predetermined point of pressure desired to admit from the main train or brake pipe, such excess pressure therein that may be required to force a pressure-plate against the governor-spring, the movement of said pressure-plate feeds, retains and governs the fluid-pressure in the brake-piston cylinder, said pressure-plate is adapted to reciprocate between pressures, so that as soon as required pressure reaches or flows into the brake-piston cylinder, said flow of excess pressure is cut off until the pressure in the brake-piston cylinder has been reduced then the excess pressure shifts the pressure-plate opening a passage to the brake-piston cylinder simultaneously holding the exhaust-passage closed while the pressure-plate is being reciprocated between pressures, substantially as set forth.

34. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having automatic duplex governor means on each car or vehicle, in a retaining-valve mechanism, so adapted that one of said governor-springs is set under a certain predetermined point of pressure, by the screw-plug to hold the valve closed in the flexible-diaphragm chamber until the desired pressure in said chamber compresses the said governor-spring by raising the flexible diaphragm or pressure-plate, enough to admit the flow of pressure into a passage leading into the piston-chamber containing the governor-retaining slide-valve piston, which piston is set against the head-inlet casting under a certain predetermined point of pressure by the screw-plug in the retaining-valve chamber, compressing the governor-spring to hold the slide-valve with open exhaust and to resist the fluid-pressure from the source of supply, in excess of the desired amount of fluid-pressure required in the brake-piston cylinder, to perpetuate an application of the brakes, to any degree of pressure desired therein, the flow of fluid-pressure will continue to flow through the groove in said piston-chamber bushing until the desired amount is reached in the brake-piston cylinder, holding the retaining slide-valve to close the exhaust-passage leading from the brake-piston cylinder to the atmosphere, until the piston moves in the cylinder being equalized between pressures, and will remain in such position until the fluid-pressure in said brake-piston cylinder, becomes reduced, then the piston will shift so as to admit more fluid-pressure from the source of supply without opening the exhaust-passage leading from the brake-piston cylinder to the atmosphere, substantially as set forth.

35. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having operative means in a duplex automatic governor-retaining-valve feed-valve device adapted to hold open an exhaust-passage during all service and emergency applications of the brakes, made by a reduction of fluid under pressure in the main train or brake pipe, retaining-valve feed-valve device adapted to close only the exhaust-passage leading from the brake-piston cylinder to atmosphere, and to feed said brake-piston cylinder through same exhaust-passage and govern the same therein while the pressure is flowing from the retaining-valve chamber to the brake-piston cylinder after the fluid under pressure in the main service-valve chamber and auxiliary reservoir is governed to any predetermined point of pressure desired cutting off the excess pressure that is in the main train or brake pipe so that only a normal pressure exists in the main service-valve chamber and auxiliary reservoir, substantially as set forth.

36. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and brake-piston cylinder, having automatic indicating means to indicate the fluid under pressure simultaneously in the main train or brake pipe and the brake-piston cylinder, after the fluid under pressure in the main train or brake pipe is cut off from flowing into the main service-valve chamber, auxiliary reservoir, and brake-piston cylinder, the fluid-pressure admitted into said brake-piston cylinder from an excess pressure in the main train or brake pipe through a duplex automatic governor-retaining-valve feed-valve device, the exhaust-passage from the brake-piston cylinder being used as a supply-passage from the main train or brake pipe to the brake-piston cylinder to supply the brake-piston cylinder with any desired amount of the excess fluid-pressure in the main train or brake pipe, a steam-supply pipe communicating the boiler of the locomotive with the equalizing-reservoir adapted to charge the air-brake system with steam when the air-fluid pressure in the system is not to that point of pressure desired for an application of the brakes, or to continue an application the steam-pressure being governed and regulated by the application and controlling device without shifting the screw-plug in the governor-spring chamber of such controlling mechanism, a solid or non-porous pressure-plate between the governor-spring chamber and the main train or brake pipe pressure, substantially as set forth.

37. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having means in an application controlling or regulating device to control the fluid under pressure in the system, by manipulation, first, to admit normal fluid-pressure into the main train or brake pipe from the source of supply and reduce the same therein by admitting it to atmosphere, for service or emergency application of the brakes, second, to regulate the excess fluid under pressure in the main train or brake pipe, without increasing the fluid-pressure in the main service-valve chamber and auxiliary reservoir, by manipulating the governor portions thereof to only compress the governor-spring to a higher tension of pressure, without turning the spring-chamber or screw-plug therein, by means disconnected from the spring-chamber and screw-plug, for the purpose of feeding the brake-piston cylinder with fluid-pressure while the excess pressure exists in the main train or brake pipe to make a direct application of the brakes or perpetuate an application of the brakes through a duplex, automatic governor-retaining-valve feed-valve device, a solid or non-porous pressure-plate forms a tight partition between the governor-spring chamber and the passages and chambers that communicate with the main train or brake pipe, substantially as set forth.

38. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having a main steam-cylinder forming a part of the casting to compress fluid under pressure of a cylinder-head, a main distribution-valve working in a chamber, a differential piston in said chamber, consisting of two pistons of different areas, connected to the main valve, one of said pistons being exposed at all times on one side to the fluid-pressure in the exhaust-passage leading to the atmosphere, and the other piston being exposed alternately to live-steam-fluid pressure after flowing through the governor-valve chamber in the same casting, and also to the pressure in the exhaust-passage, and a reversing-valve controlling the supply to and release of steam from the latter piston, through separate ports said reversing-valve being connected to a stem which extends centrally into the main steam-cylinder and is moved directly by the main steam-piston at the extremity of its stroke in either direction, a passage leading from the nozzle formed in the casting to the governor-valve chamber, an automatic governor-valve fitted therein, adapted to be secured to a piston operated thereby by a pressure flowing through cored passages in the castings forming the mechanism to compress fluid under pressure, said passage is an always-open one between the air-fluid-compression chamber and the flexible-diaphragm chamber, substantially as set forth.

39. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having an automatic regulating device to compress fluid under pressure adapted to have a main distribution-valve, of a reversing-valve controlling the movements of the main valve, and a stem connected to the reversing-valve and moved in either direction by the movement of the main piston, said stem being alternately exposed to pressure of live steam direct from an automatic-governor-valve chamber formed in the casting of the mechanism, or exhaust-steam at its opposite end, whereby it is held in its proper position by live-steam pressure until moved by the main steam-piston, a passage leading from the air-fluid-pressure chamber to the flexible-diaphragm chamber through the castings of the mechanism so that when a certain pressure exists in said passage and said chambers, such pressure will operate means in the flexible-diaphragm chamber to admit the flow of pressure to operate a device to cut off the steam from operating said main steam-piston, an always-open pipe between the device or mechanism that compresses air fluid under pressure and the boiler of the locomotive, the device is so adapted that the air fluid under pressure drawn through valves from the atmosphere and charged through valves into an air-fluid-pressure chamber that the fluid-pressure in said chamber will be governed to any predetermined point of fluid-pressure desired before flowing into pipes and main reservoirs of the air-brake system, substantially as set forth.

40. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having in an automatic mechanism, automatically regulated only by the pressure in said mechanism and adapted to be operated by steam direct from the locomotive to compress air fluid under pressure to any point desired, the combination of a main distribution-valve, and a differential piston connected thereto for the moving of said valve, a reversing-valve controlling the supply of steam to the larger end only of said piston through a port opening into the end of the piston-chamber, and the exhaust of steam through a separate port located some distance from the end of the piston-chamber, whereby the piston may close the exhaust-port before reaching the end of its stroke and thereby cause the piston to be cushioned, a valve adapted to be shifted on a flat seat between the differential pistons in said chamber, which chamber is formed in one of the castings and a passage leading therefrom through the casting to an automatic governor device, that may be formed in the same casting or any other casting which makes up the entire mechanism that compresses air fluid under pressure from the atmosphere, and discharging the same into a fluid-pressure chamber, which chamber has an open passage at all times leading to the flexible-diaphragm chamber of the governor device, said passage is cored through the several castings that form said mechanism, an always-open passage leading from the automatic-governor steam-valve chamber to the nozzle of the mechanism, at which place or part the main steam-pipe is connected for the flow of live steam from the boiler of the locomotive, a governor having a piston formed in the guideway for the purpose of preventing leakage of steam from the governor steam-valve chamber to atmosphere, a main distribution-valve and differential-piston chamber may be formed in the same casting with that of the automatic governor device, which device governs or cuts off the steam while the steam is flowing through the cored passage in the mechanism through said distribution and differential-piston chamber, the said differential-piston and distribution valve is operated by a steam-pressure for the purpose of admitting live steam into a main-piston cylinder, and exhaust therefrom, a connecting piston-rod, connecting a main steam-piston with that of a main air-fluid piston, so that the main steam-piston will operate or shift the main air-piston to compress fluid under pressure from the atmosphere through valves, and discharge the same through similar valves into a fluid-pressure chamber, the pressure flowing in said chamber will be regulated to any predetermined point of pressure fluid-pressure brake system, substantially as set forth.

41. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having means in a fluid-pressure brake system adapted so that live steam will flow through the pipes from the boiler of the locomotive into the application and controlling device, also into the equalizing-reservoir, attached thereto, for the purpose of communicating the boiler with the main train or brake pipe, so that the system may be charged with steam instead of air pressure, a vent and escape pipe from the governor device formed in the casting, of the device that compresses fluid under pressure to the atmosphere, substantially as set forth.

42. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, and an auxiliary reservoir, and a brake-piston cylinder, having in a duplex air-compressing mechanism consisting of two steam-cylinders, containing pistons connected with pistons in two air-cylinders, two steam-valves arranged in line with said pistons and actuated by them, a series of ports connecting each steam-valve with both ends of the opposite cylinder, so that the action of each piston controls the movement of the other, two air-cylinders with inlet-valves from the atmosphere to the larger cylinder, valves between the larger cylinder and the smaller cylinder, which will admit air to the smaller cylinder, first from the atmosphere through the main-inlet-valve chambers, and secondly, from the larger cylinder to the smaller cylinder, and valves between the smaller cylinder and a passage leading to a compressure-chamber, a passage leading or cored through the castings of the duplex mechanism into a flexible-diaphragm chamber of an automatic governor device, formed in one of the castings that forms a part of the mechanism, an automatic governor mechanism formed in the main casting independent of any threaded-pipe means for the flow of live steam from the boiler of the locomotive, a passage leading from the nozzle of the steam-inlet to said automatic-governor steam-va⎯ chamber, a passage leading from the ⎯matic-governor steam-valve cha⎯⎯ distrib⎯⎯ ⎯⎯l⎯⎯ chamber 43. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having automatic means to compress air fluid under pressure and the same to be governed automatically by the mechanism before it flows into other parts of the fluid-pressure brake system, a passage leading from the fluid-pressure chamber through the castings into the flexible-diaphragm chamber of the automatic governor device, forms and becomes one of the chambers forming the mechanism, actuated by live-steam pressure from the locomotive to compress air-fluid pressure to any point of predetermined fluid-pressure desired, an automatic governor device formed in the castings of the mechanism, independent of any threaded means or pipe connections to its chamber governing the steam-inlet to and through the differential-piston and distribution-valve chamber, a device with an automatic regulator to regulate or govern the fluid under pressure in the mechanism, so that the pistons both the main steam-piston and the main air-piston would cease operations if the outlet-nozzle of the fluid-compressure chamber be closed, said operations of the main pistons will cease when the fluid-pressure in the fluid-pressure chamber reaches a certain predetermined point of pressure, the same being governed independent of any other source of supply than that from the fluid-pressure chamber, substantially as set forth.

44. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having in an application or controlling device, the combination of a main valve, a discharge-valve and connections by which the discharge-valve may be opened or acted upon by fluid under pressure from the main train or brake pipe in an emergency application of the brakes, said main valve so adapted to release air from the main train or brake pipe when in position to make an emergency application of the brakes, by a reduction of fluid-pressure in the main train or brake pipe, a discharge-valve and connections by which the discharge-valve opened by fluid under pressure and adapted to release air from the main train or brake when the main valve is in position to ....ncy application of the brakes, lated so that the devices increase the tension of pressure in a governor-spring without turning the screw-plug in the governor-spring chamber, so manipulated by the will of the engineer, the manipulation being done by the second handle from that of the discharge-valve, a solid or non-porous pressure-plate between the governor-spring chamber and the main train or brake pipe, substantially as set forth.

45. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir and a brake-piston cylinder, having a discharge-valve or a device to release fluid under pressure from the main train or brake pipe, a piston or diaphragm connected thereto and operated by variations of fluid under pressure, on the one side from that of the equalizing-reservoir, while on the opposite side for the release of fluid under pressure from the main train or brake pipe, having ports and passages from a multiple number of automatic governor devices, and also from the main train or brake pipe, and from one side of the piston or diaphragm directly to the atmosphere in an emergency application of the brakes, by a reduction of fluid under pressure in the main train or brake pipe, said reduction may be from the excess pressure in the main train or brake pipe down to the normal of said pressure, changing the pressure in the main train or brake pipe by a manipulated governor device with a feed-passage from that of the source of supply and connected therewith an equalizing-reservoir, and a passage leading from the manipulated device to and through the controlling mechanism into the main train or brake pipe, the fluid-pressure is changed by the manipulated governor device by reducing the tension of pressure in the governor-spring without turning or unseating the screw-plug in the governor-spring chamber, a solid or non-porous pressure-plate forming a partition between the main train or brake pipe and the governor-spring chamber, in a controlling device for releasing the air from the main train or brake pipe, a piston or diaphragm connected to the discharge-valve and exposed to fluid-pressure on its opposite sides, an exhaust-port in the seat of the main valve, through which fluid under pressure is released in making an emergency application of the brakes by releasing the air releases the fluid under pressure in the main train or brake pipe, a passage in the main valve through which the fluid-pressure is released from one side of a piston to said exhaust-port, when the main valve is in a service position, the excess pipe is first to close communications between the main-service-valve chamber, auxiliary reservoir, and main train or brake pipe, and all automatically govern the fluid-pressure in said chamber and reservoir, second, to operate a duplex automatic retaining-valve feed-valve device to retain, feed and govern the fluid-pressure that flows through the cavity on the under side of the main service-valve into passages leading to a reducing or leakage device and thence into the brake-piston cylinder, such pressure being governed by the duplex means to that predetermined point less than that either in the main train or brake pipe or the main-service-valve chamber and auxiliary reservoir, substantially as set forth.

46. In an automatic fluid-pressure brake system, the combination of an automatic regulating device to compress fluid under pressure, a main supply-pipe, a main reservoir, a controlling or an application device, with supplemental governors attached thereto, an indicating-gage, an equalizing-reservoir, a main train or brake pipe, a main service-valve, an auxiliary reservoir, and a brake-piston cylinder, having in a controlling or an application device adapted to be operated by the engineer, secured to convenient parts of the locomotive and in communication with the source of supply of both steam and air, to admit, govern and control the fluid under pressure, either steam or air into and to operate the air-brake system on each car or vehicle, a passage from the controlling device to the main train or brake pipe, a multiple regulating-valve in the passage, with means to increase the tension of pressure in the governor-spring at will, and the piston or diaphragm which is independent of such regulating or governor means and is moved by the pressure of a spring to effect the opening of a valve when the main train or brake pipe is below a determined maximum, and is moved by fluid-pressure to permit the closure of the valve by the pressure pressing against a solid or non-porous pressure-plate, said pressure-plate being held to resist such fluid-pressure by a governor-spring so adapted to have its tension of pressure increased, to any point of pressure desired, to permit the closure of the valve when the main train or brake pipe pressure is above the determined maximum, a cap-section which covers the main valve, a section on which a raised seat is formed for the main valve, and a lower section containing the piston-chamber of the discharge-valve, with suitable means to attach and communicate the passages with that of the main train or brake pipe, a passage leading from the chamber above the main rotary valve, into a series of governor-valves, so adapted that as the pressure is admitted through said passage to govern the fluid-pressure in the main train or brake pipe as the pressure is admitted into and through each succeeding governor device, an upper section which covers the main rotary valve and forms the bearing for its stem, a middle section having a raised seat for the main rotary valve, which covers the piston-chamber of the discharge-valve and a lower section which contains the piston-chamber of the discharge-valve and is connected to one or more pipes including that of the main train or brake pipe, the said piston-chamber being in communication with an automatic governor slide-valve feed-valve device, adapted to admit fluid under pressure from the source of supply through a slide-valve feed-valve chamber, and also adapted to admit the fluid-pressure in the rear of the piston of the slide-valve feed-valve through a passage and port into and through a flexible diaphragm and valve chamber, thence communicating with the main train or brake pipe, a solid or non-porous pressure-plate forming an air-tight partition between such admission-valves and the governor-spring chamber, cutting off communication between the chambers and passages that communicate with the main train or brake pipe, with that of the governor-spring chamber, which carries a governor-spring formed and compressed under a certain predetermined point of pressure, set at a normal tension of pressure, and adapted to be compressed to a higher tension of pressure, without unseating the screw-plug or turning the governor-spring chamber, the means to increase the tension of the governor-spring is such that may be manipulated by the engineer at will, a slide-valve adapted to cut off the pressure from flowing through the device after the pin-valve is closed, substantially as set forth.

In testimony whereof I affix my signature in presence of two witnesses.

JOHN SCOTT BUBB.

Witnesses:
  H. A. COLWELL,
  W. PONOCK.